US012469079B2

(12) United States Patent
Wilkins et al.

(10) Patent No.: US 12,469,079 B2
(45) Date of Patent: *Nov. 11, 2025

(54) CRYPTO MULTIPLE SECURITY ASSET CREATION AND REDEMPTION PLATFORM

(71) Applicant: tZERO IP, LLC, Salt Lake City, UT (US)

(72) Inventors: Alec Wilkins, Salt Lake City, UT (US); Robert Christensen, Sandy, UT (US); John Wesley Welborn, Arlington, VA (US); John Tabacco, Jersey City, NJ (US); Glen Nickle, Logan, UT (US)

(73) Assignee: tZERO IP, LLC, Salt Lake City, UT (US)

( * ) Notice: Subject to any disclaimer, the term of this patent is extended or adjusted under 35 U.S.C. 154(b) by 170 days.

This patent is subject to a terminal disclaimer.

(21) Appl. No.: 18/327,528

(22) Filed: Jun. 1, 2023

(65) Prior Publication Data

US 2023/0306513 A1  Sep. 28, 2023

Related U.S. Application Data

(63) Continuation of application No. 15/396,030, filed on Dec. 30, 2016, now Pat. No. 11,704,733, which is a
(Continued)

(51) Int. Cl.
*G06Q 40/04* (2012.01)
*H04L 9/00* (2022.01)
(Continued)

(52) U.S. Cl.
CPC ........... *G06Q 40/04* (2013.01); *H04L 9/0637* (2013.01); *H04L 9/14* (2013.01); *H04L 9/30* (2013.01);
(Continued)

(58) Field of Classification Search
CPC .. G06Q 40/04; G06Q 2220/00; H04L 9/0637; H04L 9/14; H04L 9/30; H04L 9/3236; H04L 9/3247; H04L 9/50; H04L 2209/56
See application file for complete search history.

(56) References Cited

U.S. PATENT DOCUMENTS

| 5,629,980 A | 5/1997 | Stefik et al. |
| 6,629,082 B1 | 9/2003 | Hambrecht et al. |

(Continued)

FOREIGN PATENT DOCUMENTS

| CN | 102479375 A | 5/2012 |
| GB | 2514716 A | 12/2014 |

(Continued)

OTHER PUBLICATIONS

Anonymous, "Bitcoin", "https://en.wikipedia.org/w/index.php?title+Bitcoin&oldid+646184058", Feb. 8, 2015, pp. 1-39, XP055319200, Publisher: Wikipedia, The Free Encyclopedia. Retrieved on Nov. 14, 2016.
(Continued)

*Primary Examiner* — John W Hayes
*Assistant Examiner* — Yingying Zhou
(74) *Attorney, Agent, or Firm* — Fogg & Powers LLC

(57) ABSTRACT

An asset trading system utilizing a distributed ledger and configured to: when a creation request to create a digital fund token representing at least one share of a fund having a plurality of different assets (i) is received, (ii) is electronically signed with a private key associated with a first addressed account, and (iii) indicates a composition of the at least one share of the fund: place the plurality of different assets represented by the at least one share of the fund into an escrow account; create the digital fund token, wherein the
(Continued)

digital fund token indicates the composition of the share of the fund; and record the creation of the digital fund token on a distributed ledger.

20 Claims, 13 Drawing Sheets

Related U.S. Application Data continuation-in-part of application No. 15/141,582, filed on Apr. 28, 2016.

(60) Provisional application No. 62/273,848, filed on Dec. 31, 2015, provisional application No. 62/246,713, filed on Oct. 27, 2015, provisional application No. 62/156,027, filed on May 1, 2015.

(51) Int. Cl.
  *H04L 9/06* (2006.01)
  *H04L 9/14* (2006.01)
  *H04L 9/30* (2006.01)
  *H04L 9/32* (2006.01)

(52) U.S. Cl.
  CPC .......... *H04L 9/3236* (2013.01); *H04L 9/3247* (2013.01); *G06Q 2220/00* (2013.01); *H04L 9/50* (2022.05); *H04L 2209/56* (2013.01)

(56) References Cited

U.S. PATENT DOCUMENTS

| | | | |
|---|---|---|---|
| 6,668,325 B1 | 12/2003 | Collberg et al. | |
| 7,349,881 B1 | 3/2008 | Lockwood | |
| 7,587,358 B2 | 9/2009 | Hambrecht et al. | |
| 7,716,467 B1 | 5/2010 | Deffet et al. | |
| 7,937,316 B2* | 5/2011 | Friedman | G06Q 40/06 705/37 |
| 8,117,112 B2 | 2/2012 | Hambrecht et al. | |
| 8,204,821 B2 | 6/2012 | Staib et al. | |
| 8,688,575 B2* | 4/2014 | Steiner | G06Q 40/04 705/40 |
| 9,020,850 B1 | 4/2015 | Anderson | |
| 9,177,313 B1 | 11/2015 | Silverman | |
| 9,397,985 B1 | 7/2016 | Seger, II et al. | |
| 9,704,143 B2 | 7/2017 | Walker et al. | |
| 11,704,733 B2 | 7/2023 | Wilkins et al. | |
| 2002/0128958 A1 | 9/2002 | Slone | |
| 2004/0199471 A1 | 10/2004 | Hardjono | |
| 2006/0064372 A1 | 3/2006 | Gupta | |
| 2007/0106892 A1 | 5/2007 | Engberg | |
| 2007/0136181 A1 | 6/2007 | Miller | |
| 2008/0070689 A1* | 3/2008 | Van Luchene | G07F 17/32 463/42 |
| 2008/0313068 A1 | 12/2008 | Sun | |
| 2009/0177591 A1 | 7/2009 | Thorpe et al. | |
| 2009/0198630 A1* | 8/2009 | Treitler | G06Q 40/06 705/36 R |
| 2009/0276370 A1 | 11/2009 | Olson et al. | |
| 2010/0004999 A1 | 1/2010 | DePetris et al. | |
| 2010/0023371 A1* | 1/2010 | Hartz | G06Q 30/0601 705/26.1 |
| 2010/0088250 A1* | 4/2010 | Magnolia | G06Q 30/08 705/37 |
| 2010/0228665 A1* | 9/2010 | Mathieson | G06Q 40/03 705/38 |
| 2011/0035313 A1* | 2/2011 | Silverman | G06Q 40/06 705/37 |
| 2011/0161826 A1* | 6/2011 | Moore | G06Q 10/00 715/738 |
| 2011/0164192 A1 | 7/2011 | Ozawa | |
| 2011/0196723 A1* | 8/2011 | Baszucki | G06Q 30/0209 715/757 |
| 2011/0202452 A1* | 8/2011 | Chan | G06Q 40/02 705/38 |
| 2011/0258139 A1* | 10/2011 | Steiner | G06Q 40/06 705/37 |
| 2011/0295736 A1 | 12/2011 | Freer et al. | |
| 2011/0307368 A1* | 12/2011 | Silverman | G06Q 40/04 705/37 |
| 2012/0028718 A1* | 2/2012 | Barclay | G07F 17/3237 463/42 |
| 2012/0283024 A1* | 11/2012 | Van Luchene | G07F 17/32 463/42 |
| 2012/0326040 A1* | 12/2012 | Sa | G01J 1/44 250/340 |
| 2012/0330796 A1 | 12/2012 | O'Hara et al. | |
| 2013/0006840 A1 | 1/2013 | Cahn | |
| 2013/0046674 A1 | 2/2013 | Fenichel et al. | |
| 2013/0086393 A1 | 4/2013 | Pogmore | |
| 2013/0144807 A1* | 6/2013 | Packles | G06Q 40/06 705/36 R |
| 2013/0218741 A1 | 8/2013 | Fenichel et al. | |
| 2013/0268772 A1 | 10/2013 | Golle | |
| 2013/0282559 A1* | 10/2013 | Pappas | G06Q 20/06 705/39 |
| 2013/0311401 A1* | 11/2013 | Clary | G06Q 40/06 705/36 R |
| 2014/0052598 A1 | 2/2014 | Briem | |
| 2014/0201057 A1 | 7/2014 | Shuster | |
| 2014/0358762 A1* | 12/2014 | O'Hara | G06Q 40/06 705/37 |
| 2015/0026072 A1* | 1/2015 | Zhou | G06Q 20/401 705/41 |
| 2015/0046337 A1 | 2/2015 | Hu et al. | |
| 2015/0112849 A1* | 4/2015 | Fross | G06Q 40/06 705/37 |
| 2015/0220928 A1 | 8/2015 | Allen | |
| 2015/0332395 A1* | 11/2015 | Walker | G06Q 20/3678 705/69 |
| 2016/0092988 A1 | 3/2016 | Letourneau | |
| 2016/0217436 A1 | 7/2016 | Brama | |
| 2016/0224949 A1 | 8/2016 | Thomas et al. | |
| 2016/0234026 A1 | 8/2016 | Wilkins et al. | |
| 2016/0260169 A1* | 9/2016 | Arnold | G06Q 20/381 |
| 2016/0261685 A1 | 9/2016 | Chen et al. | |
| 2016/0261690 A1 | 9/2016 | Ford | |
| 2016/0267474 A1 | 9/2016 | Lingham et al. | |
| 2016/0267566 A1 | 9/2016 | Levitt et al. | |
| 2016/0267605 A1 | 9/2016 | Lingham et al. | |
| 2016/0292680 A1* | 10/2016 | Wilson, Jr. | H04L 9/30 |
| 2016/0321751 A1 | 11/2016 | Creighton, IV et al. | |
| 2016/0321752 A1 | 11/2016 | Tabacco et al. | |
| 2016/0350749 A1 | 12/2016 | Wilkins et al. | |

FOREIGN PATENT DOCUMENTS

| | | | |
|---|---|---|---|
| JP | 2012022708 A | 2/2012 | |
| JP | 201227808 A | 11/2012 | |
| WO | 0184906 A2 | 11/2001 | |
| WO | WO-2012123394 A1 * | 9/2012 | ........... G06F 21/335 |
| WO | 2016178999 A1 | 11/2016 | |
| WO | 2017131929 A1 | 8/2017 | |

OTHER PUBLICATIONS

Anonymous, "Digital Signature", "https://en.wikipedia.org/w/index.php?title=Digital_signature&oldid=646145535", Feb. 8, 2015, pp. 1-11, XP055319249, Publisher: Wikipedia, The Free Encyclopedia. Retrieved on Nov. 14, 2016.

Australian Government IP Australia, "Examination report No. 1 for standard patent application from AU Application No. 2016389498", from Foreign Counterpart to U.S. Appl. No. 15/396,030, filed Nov. 16, 2021, pp. 1 through 3, Published: AU.

Australian Government IP Australia, "Examination report No. 2 for standard patent application" from AU Application No. 2016389498, from Foreign Counterpart to U.S. Appl. No. 15/396,030, filed Nov. 14, 2022, pp. 1 through 5, Published: AU.

(56) References Cited

OTHER PUBLICATIONS

Bhanot et al, "Distributed Ledgers: Possibilities and Challenges in Capital Markets Applications", "Cognizant 20-20 Insights", "https://www.cognizant.com/whitepapers/distributed-ledgers-possibilities-and-challenges-in-capital-markets-applications-codex1974.pdf", Dated Jun. 1, 2016, Retrieved on Feb. 20, 2018, pp. 1-10, Publisher: Cognizant.

BTC Inc, "Overstock Plans to Open Blockchain-Based Stock Exchange to to Other Publicly Traded Companies", "https://distributed.com/news/overstock-plans-to-open-blockchain-based-stock-exchange-t-totother-publicly-traded-companies/", Retrieved on Mar. 27, 2018, pp. 1-6, Publisher: BTC Media.

Canadian Intellectual Property Office, "Office Action", from CA Application No. 3,010,413, from Foreign Counterpart to U.S. Appl. No. 15/396,030, filed Jan. 31, 2023, pp. 1 through 6, Published: CA.

China National Intellectual Property Administration, "Decision of Rejection", from CN Application No. 2016/0077538.X, May 18, 2023, from Foreign Counterpart to U.S. Appl. No. 15/396,030, pp. 1 through 28, Published: CN.

China National Intellectual Property Administration, "Notice on the First Office Action from CN Application No. 201680077538.X dated Dec. 2, 2021", from Foreign Counterpart to U.S. Appl. No. 15/396,030, pp. 1 through 22, Published: CN.

China National Intellectual Property Office, "Notice on the Second Office Action" from CN Application No. 201680077538.X, from Foreign Counterpart to U.S. Appl. No. 15/396,030, filed Oct. 25, 2022, pp. 1 through 27, Published: CN.

Del Castillo, "Overstock Raises $10.9 Million in First Blockchain Stock Issuance", "CoinDesk", "https://www.coindesk.com/overstock-first-blockchain-stock-issuance/", Updated Dec. 16, 2016, Retrieved Feb. 20, 2018, pp. 1-5.

European Patent Office, "Communication pursuant to Article 94(3) EPC from EP Application No. 16888591.1", from Foreign Counterpart to U.S. Appl. No. 15/396,030, filed Mar. 18, 2021, pp. 1 through 12, Published: EP.

European Patent Office, "Extended European Search Report from EP Application No. 16888591.1 mailed Jul. 4, 2019", from Foreign Counterpart to U.S. Appl. No. 15/396,030, pp. 1-10, Published: EP.

Finextra, "Overstock Looks to Issue Bitcoin-Style Stocks", "Finextra", "https://www.finextra.com/newsarticle/27294/overstock-looks-to-issue-bitcoin-style-stocks", Dated Apr. 29, 2015, Retrieved on Feb. 20, 2018, pp. 1-3.

Guagliardo et al, "Blockchain and Public Securities: Shedding Light on 'Going Dark'", "Power of Intelligence, Insight Center: Publications", "http://www.pepperlaw.com/publications/blockchain-and-public-securities-shedding-light-on-going-dark-2016-09-27/", Dated Sep. 27, 2016, Retrieved on Feb. 20, 2018, pp. 1-3. Publisher: Pepper Hamilton LLC.

Intellectual Property Office of Singapore, "Invitation to Respond to Written Opinion and Written Opinion from SG Application No. 11201805648P", from Foreign Counterpart to U.S. Appl. No. 15/396,030, filed Jun. 2, 2020, pp. 1 through 8, Published: SG.

Intellectual Property Office of Singapore, "Invitation to Respond to Written Opinion from SG Application No. 11201805648P mailed Jul. 15, 2019", from Foreign Counterpart to U.S. Appl. No. 15/396,030, pp. 1-7, Published: SG.

Intellectual Property Office of Singapore, "Notice of Eligibility for Grant from SG Application No. 11201805648P", from Foreign Counterpart to U.S. Appl. No. 15/396,030, filed Mar. 22, 2021, pp. 1 through 5, Published: SG.

International Bureau, "International Preliminary Report on Patentability from PCT Application No. PCT/US2016/069544 mailed Jul. 12, 2018", from Foreign Counterpart to U.S. Appl. No. 15/396,030, pp. 1-7, Published: WO.

International Searching Authority, "International Search Report and Written Opinion from PCT Application No. PCT/US16/69544 mailed Mar. 24, 2017", from Foreign Counterpart to U.S. Appl. No. 15/396,030, pp. 1-12, Published: WO.

Japanese Patent Office, "Notice of Reasons for Rejection from JP Application No. 2018-534161", from Foreign Counterpart to U.S. Appl. No. 15/396,030, filed Jan. 4, 2021, pp. 1 through 11, Published: JP.

Japanese Patent Office, "Notice of Allowance from JP Application No. 2018-534161", from Foreign Counterpart to U.S. Appl. No. 15/396,030, filed Apr. 15, 2021, pp. 1 through 4, Published: JP.

Marcogliese et al., "Bitcoins and Blockchain—The Use of Distributed Ledger Technology for the Issuance of Digital Securities", "Cleary M & A and Corporate Governance Watch, Mergers and Acquisitions, Corporate Governance, Shareholder Activism", "Posted in SEC Guidance", "https://www.clearymawatch.com/2016/01/bitcoins-and-blockchain-the-use-of-distributed-ledger-technology-for-the-issuance-of-digital-securities/", Dated Jan. 4, 2016, Retrieved on Feb. 20, 2018, pp. 1-7. Publisher: Cleary Gottlieb Steen & Hamilton LLP.

Metz, "SEC Approves Plan to Issue Stock Via Bitcoin's Blockchain", "Wired, Business", "https://www.wired.com/2015/12/sec-approves-plan-to-issue-company-stock-via-the-bitcoin-blockchain/", Dated Dec. 15, 2016, Retrieved on Mar. 27, 2018, pp. 1-7.

Nitchman, "First Public Offering Using Blockchain Planned", "XBRL", "https://www.xbrl.org/first-public-offering-using-blockchain-planned/", Posted on Mar. 18, 2016, Retrieved on Feb. 20, 2018, pp. 1-3, Publisher: XBRL International Inc.

Prisco, "Overstock Files Crypto Stock Exchange Prospectus with the SEC", "Bitcoin Magazine", "https://bitcoinmagazine.com/articles/overstock-files-crypto-stock-exchange-prospectus-sec-1430258150/", Dated Apr. 28, 2015, Retrieved on Feb. 20, 2018, pp. 1-5.

Richards, "Wall Street Left Out in Overstock's US $500M Stocks Issue", "CoinTelegraph", "https://cointelegraph.com/news/wall-street-left-out-in-overstocks-us500m-stocks-issue", Dated Apr. 28, 2015, Retrieved on Feb. 20, 2018, pp. 1-4, Publisher: Cointelegraph.

U.S. Patent and Trademark Office, "Advisory Action", U.S. Appl. No. 15/396,030, May 24, 2021, pp. 1 through 2, Published: US.

U.S. Patent and Trademark Office, "Final Office Action", U.S. Appl. No. 15/396,030, Feb. 17, 2022, pp. 1 through 24, Published: US.

U.S. Patent and Trademark Office, "Final Office Action", U.S. Appl. No. 15/396,030, Feb. 19, 2020, pp. 1-32, Published: US.

U.S. Patent and Trademark Office, "Final Office Action", U.S. Appl. No. 15/396,030, Mar. 16, 2021, pp. 1 through 25, Published: US.

U.S. Patent and Trademark Office, "Notice of Allowance", U.S. Appl. No. 15/396,030, Mar. 1, 2023, pp. 1 through 24, Published: US.

U.S. Patent and Trademark Office, "Office Action", U.S. Appl. No. 15/396,030, Jul. 25, 2019, pp. 1-24, Published: US.

U.S. Patent and Trademark Office, "Office Action", U.S. Appl. No. 15/396,030, Sep. 15, 2020, pp. 1 through 27, Published: US.

U.S. Patent and Trademark Office, "Office Action", U.S. Appl. No. 15/396,030, Sep. 15, 2022, pp. 1 through 16, Published: US.

U.S. Patent and Trademark Office, "Office Action", U.S. Appl. No. 15/396,030, Oct. 28, 2021, pp. 1 through 23, Published: US.

U.S. Patent and Trademark Office, "Response to Amendment Under Rule 312", U.S. Appl. No. 15/396,030, Jun. 6, 2023, pp. 1 through 3, Published: US.

U.S. Patent and Trademark Office, "Third-Party Submission Under 37 CFR 1.290 Concise Description of Relevance", "U.S. Appl. No. 15/396,030", Dated May 30, 2017, pp. 1-192, Published in: US.

Vakta et al., "Blockchain Disruption in Security Issuance", "CAPGEMINI", "https://www.capgemini.com/wp-content/uploads/2017/07/blockchain_securities_issuance_v6_web.pdf", Dated Jul. 12, 2017, Retrieved Mar. 27, 2018, pp. 1-16.

Van Eyk, "Overstock.com Seeks to Build New Stock Market", "Bitcoin Magazine", "https://bitcoinmagazine.com/articles/overstock-com-seeks-build-new-stock-market-1412623808/", Dated Oct. 6, 2014, Retrieved on Feb. 20, 2018, pp. 1-5.

White, "How Computers Work", Seventh Edition, Oct. 15, 2003, pp. 1-23, Que.

Zacks, "MasterCard (MA) Files for Blockchain Patents, Introduces AI", "Zacks Equity Research", "https://www.yahoo.com/news/mastercard-ma-files-blockchain-patents-151203016.html", Dated Dec. 1, 2016, Retrieved on Feb. 20, 2018, pp. 1-8.

(56) References Cited

OTHER PUBLICATIONS

Korean Intellectual Property Office, "Notification of Preliminary Rejection", dated Mar. 11, 2024 from KR Application No. 10-2018-7018569, from Foreign Counterpart to U.S. Appl. No. 15/396,030, pp. 1 through 8, Published: KR.

Australian Government IP Australia, "Examination report No. 1 for standard patent application", from AU Application No. 2022271429, from Foreign Counterpart to U.S. Appl. No. 15/396,030, filed Nov. 20, 2023, pp. 1 through 3, Published: AU.

Canadian Intellectual Property Office, "Requisition by the Examiner in Accordance with Subsection 86(2)", from CA Application No. 3,010,413, from Foreign Counterpart to U.S. Appl. No. 15/396,030, filed Nov. 22, 2023, pp. 1 through 5, Published: CA.

European Patent Office, "Communication pursuant to Article 94(3) EPC", from EP Application No. 16888591.1, Nov. 30, 2023, from Foreign Counterpart to U.S. Appl. No. 15/396,030, pp. 1 through 7, Published: EP.

European Patent Office, "Communication pursuant to Article 94(3) EPC", dated Jun. 26, 2024, from EP Application No. 16888591.1, from Foreign Counterpart to U.S. Appl. No. 15/396,030, pp. 1 through 9, Published: EP.

* cited by examiner

CRYPTO MULTIPLE SECURITY ASSET CREATION AND REDEMPTION PLATFORM

CROSS-REFERENCE TO RELATED APPLICATIONS

This application is a continuation of U.S. patent application Ser. No. 15/396,030 filed on Dec. 30, 2016, entitled "CRYPTO MULTIPLE SECURITY ASSET CREATION AND REDEMPTION PLATFORM" which claims the benefit of U.S. Provisional Patent Application Ser. No. 62/273,848 filed on Dec. 31, 2015, entitled "CRYPTO ETF CREATION AND REDEMPTION PLATFORM", both of which are hereby incorporated herein by reference.

This application is also a continuation-in-part of U.S. patent application Ser. No. 15/141,582, filed Apr. 28, 2016, entitled "DIGITALLY ENCRYPTED SECURITIES PLATFORM, ALONG WITH METHODS AND SYSTEMS FOR THE SAME" which claims the benefit of U.S. Provisional Application No. 62/156,027, filed on May 1, 2015, entitled "DIGITALLY ENCRYPTED CUSTODIAL REGISTRY FOR SECURITIES LENDING, BORROWING AND TRADING USING A DISTRIBUTED LEDGER", and U.S. Provisional Application No. 62/246,713, filed on Oct. 27, 2015, entitled "DIGITALLY ENCRYPTED CUSTODIAL REGISTRY FOR SECURITIES LENDING, BORROWING AND TRADING USING A DISTRIBUTED LEDGER", all of which are hereby incorporated herein by reference.

TECHNICAL FIELD

Various embodiments of the present disclosure generally relate to trading. More specifically, various embodiments of the present disclosure relate to systems and methods for creating, redeeming, and trading multiple security assets such as various types of funds including, but not limited to exchange traded funds ("ETFs"), mutual funds, index funds, open-end funds, closed-end funds, high yield bond funds, corporate bond funds, municipal bond funds, government bond funds, bond funds, money market funds, balanced funds, equity funds, fixed income funds, global funds, international funds, specialty funds, index funds, commodity funds, currency funds, and/or real estate funds using distributed and cryptographic ("crypto") techniques.

BACKGROUND

Recent increasing adoption of crypto currencies (such as Bitcoin) throughout the world creates challenges for existing trading systems. For example, market data and ownership data are stored differently. Additionally, existing trading systems use protocols for pre-trade communications and execution that are not compatible with trading systems that trade crypto currencies.

The present disclosure overcomes these and other limitations of existing trading systems and provides other benefits, as will become clearer to those skilled in the art from the following description.

SUMMARY

An asset trading system utilizing a distributed ledger and configured to: when a creation request to create a digital fund token representing at least one share of a fund having a plurality of different assets (i) is received, (ii) is electronically signed with a private key associated with a first addressed account, and (iii) indicates a composition of the at least one share of the fund: place the plurality of different assets represented by the at least one share of the fund into an escrow account; create the digital fund token, wherein the digital fund token indicates the composition of the share of the fund; and record the creation of the digital fund token on a distributed ledger.

BRIEF DESCRIPTION OF THE DRAWINGS

Embodiments of the present disclosure will be described and explained through the use of the accompanying drawings, in which.

DETAILED DESCRIPTION

Figure 1:
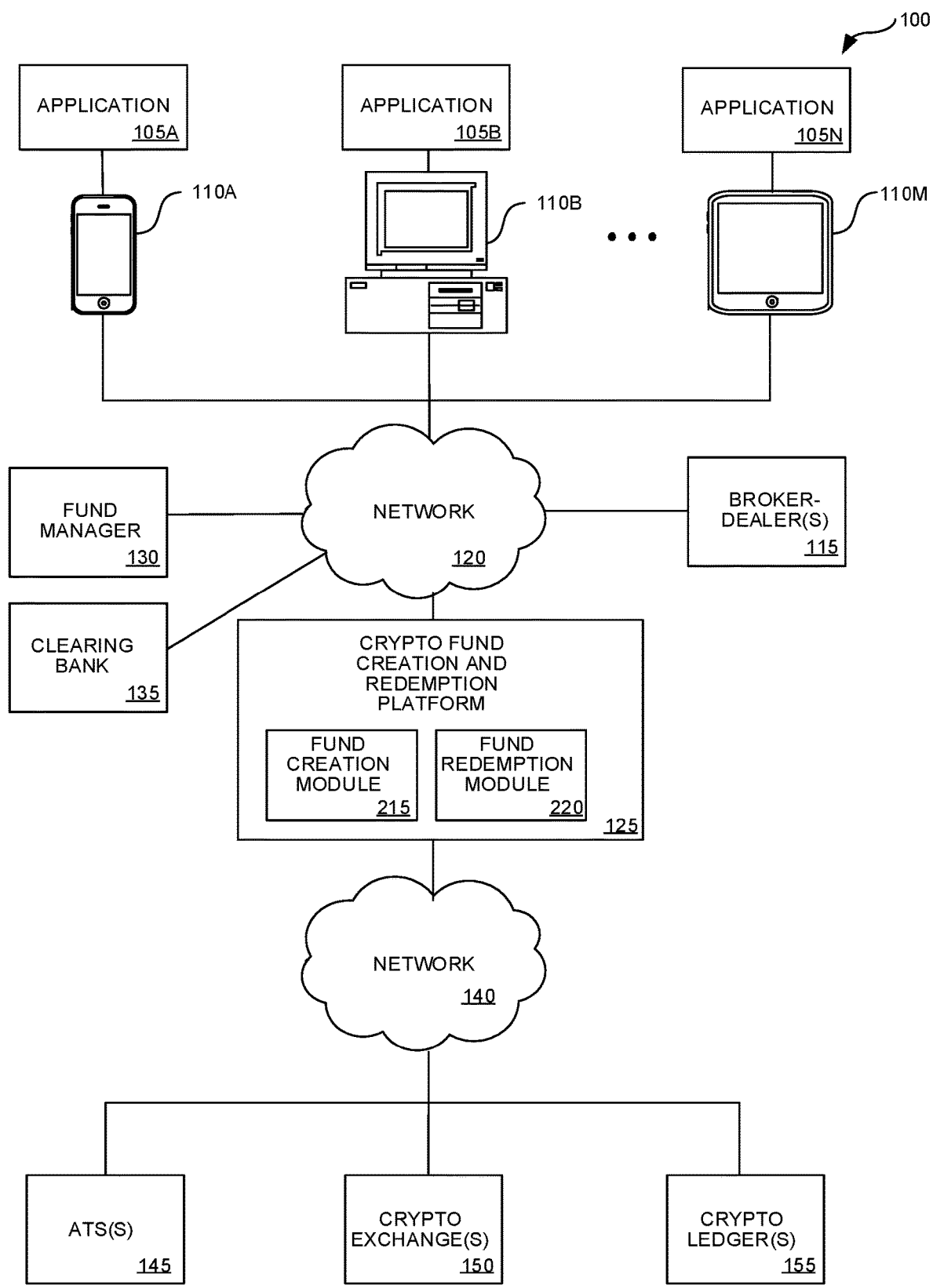
FIG. 1 illustrates an example of a network-based operating environment in accordance with various embodiments of the disclosure.

Various embodiments of the present disclosure generally relate to trading. More specifically, various embodiments of the present disclosure relate to systems and methods for creating, redeeming, and trading multiple security assets such as various types of funds including, but not limited to exchange traded funds ("ETFs"), mutual funds, index funds, open-end funds, closed-end funds, high yield bond funds, corporate bond funds, municipal bond funds, government bond funds, bond funds, money market funds, balanced funds, equity funds, fixed income funds, global funds, international funds, specialty funds, index funds, commodity funds, currency funds, and/or real estate funds using distributed and cryptographic techniques, and, in particular, a Crypto Fund Creation and Redemption Platform.

A mutual fund is a professionally managed investment fund that pools money from multiples inventors to purchase a group of securities and/or other assets. An index fund is a mutual fund designed to follow certain preset rules (such as by tracking prominent indexes such as the S&P 900 or Dow jones Industrial Average) so that the fund can track a specified group of securities and/or other assets. An ETF is a marketable security that tracks an index, a commodity, bonds, or a group of assets such as a mutual fund or index fund. ETFs have two levels of trading activity: primary and secondary. In the primary market, ETF authorized providers exchange a published group of securities in-kind plus a published cash component in exchange for ETF shares. These groups are generally very large, and one creation or redemption unit is equal to a fixed number of ETF shares. The ratio varies by product, but is usually 50,000 ETF shares per unit. fund managers can issue shares to or redeem shares from institutional investors (such as broker-dealers) in large blocks (such as 50,000 shares) called creation units. Creation unit transactions can be conducted in exchange for the deposit or delivery of a designated portfolio of in-kind securities and/or cash constituting a substantial replication, or a representation, of the securities included in the ETF's benchmark Index. Typically, individual shares of the ETF may only be purchased and sold on national securities exchanges, electronic crossing networks and other alternative trading systems through broker-dealers at market prices. Most institutional and retail clients trade ETF shares in the secondary market. In exemplary embodiments, ETF share creation and redemption can happen in two ways: (1) in-kind creation of ETF shares; and (2) cash creation of ETF shares. In exemplary embodiments of in-kind creation of ETF shares, a basket/group of securities are exchanged for a block of ETF shares ("creation unit") and the ability to create/redeem ETF shares constantly is hailed as a positive characteristic. In exemplary embodiments of cash creation of ETF shares, a market maker (MM) or an Authorized Provider (AP) cannot trade certain ETF components for delivery to an originator and a cash equivalent is substituted to the originator. Not all ETFs permit cash creation.

ETFs, mutual funds, index funds, other funds and/or other multiple security assets are unique in that they are composed of individual securities. Current systems do not address creation or redemption of ETFs, mutual funds, index funds, other funds and/or other multiple security shares in cryptographic trading systems. It is understood that any of these funds and/or other multiple security shares (such as ETFs, mutual funds, index funds, etc.) can be created and redeemed using cryptographic trading systems described herein.

Embodiments of the present disclosure provide methods and systems for fund creation and redemption through the use of the Crypto Fund Creation and Redemption Platform. The Crypto Fund Creation and Redemption Platform uses distributed ledgers/crypto ledgers (such as block chains) to document and verify ownership and availability of: (1) the digital representations of securities (referred to herein as "digital tokens") used to create the Crypto Fund shares (referred to herein as "digital fund tokens"); and (2) the digital representations of the funds and/or other multiple security shares (referred to herein as "digital fund tokens") themselves. The digital tokens and digital fund tokens are associated with various digital accounts referred to as addressed accounts or wallets. The distributed ledger records changes of ownership of the digital tokens and digital fund tokens from one digital account to another digital account.

There are various ways in which the digital fund tokens can be created and redeemed, including but not limited to: (1) directly creating and redeeming digital fund tokens based on a plurality of underlying securities and/or other assets stored in an escrow-type account; and (2) indirectly creating and redeeming digital fund tokens by digital tokenizing individual securities and/or other assets before creating digital fund tokens based on the digital tokens for the individual securities. In the first type of exemplary embodiments, digital fund tokens are created directly based on underlying securities stored in an escrow-type account. In these second type of exemplary embodiments, the digital fund tokens can be redeemed directly for the underlying securities stored in the escrow-type account. In the second type of exemplary embodiments, digital tokens for the individual securities and/or other assets are created first for securities stored in an escrow-type account and then digital fund tokens are created based on the digital tokens for the individual securities. In these second type of exemplary embodiments, the digital fund tokens are first redeemed for digital tokens for individual securities, which are then redeemed for the individual underlying securities.

In exemplary embodiments, cash creation might be necessary when in-kind creation is difficult. There can be frictions that bog down in-kind creation and redemption. Primary market liquidity depends on the Authorized Provider (AP)'s ability to transact in the basket/group of securities. In certain cases, this is difficult or nearly impossible, such as ETFs tracking non-U.S. benchmark indexes when the constituent securities are restricted from foreign ownership or when currency transactions taxes may be large. The cash creation of ETF shares is a work-around. In addition, in the case of leveraged ETFs, for which leverage is obtained through the use of total return swaps, cash creations are the only option, since the fund holdings are over-the-counter derivatives contracts. Unfortunately, cash creation of ETF shares might lead to serious technical problems, such as when a large cash creation order is accepted before a market closes, leading to a sizable difference in Net Asset Value (NAV) between the ETF shares and the underlying stocks. As trading in the underlying index is halted at the end of the trading day and the fund includes a sizeable quantity of cash such that if the market goes up a certain quantity, the fund may increase a much smaller amount, such as the case where the fund included approximately the same value in cash as it did in the value of the underlying stocks and while the stocks increase in value over night in trading, the cash itself did not.

In both of these situations, the ETF digital token provides the following technical solutions. First, for an ETF that experiences some illiquidity in one or more of its component assets, but does not allow cash creation, the digital token can be substituted for the missing component(s), where the digital token represents component shares held in escrow (or in some other segregated form). Illiquidity can be caused by a number of factors, such as an overseas market being closed, a temporary trading halt, ownership restrictions, etc. Second, for an ETF that accepts cash creation, but trading in the underlying component stocks has been halted, the digital token can represent some or all of the individual component shares, and allow them to trade on a secondary market to prevent huge differences in Net Asset Value (NAV).

Accordingly, the systems and methods described herein address problems relating to ETFs, by (1) allowing for increased liquidity, transparency, efficiency and accountability; (2) reducing investor risk for retail investors in ETFs; and (3) reducing market/systematic risk due to ETF liquidity problems. In addition, the systems and methods described herein address problems relating to fund and other multiple security assets generally, such as double spending and long settlement transaction times by using a distributed ledger and digital fund tokens to track transactions of a fund or other multiple security asset.

As noted above, in exemplary embodiments digital fund tokens are created and redeemed directly (without using intermediary digital tokens for individual securities and/or other assets). In these embodiments, to create Crypto Fund shares, a clearing bank, fund manager, or other authorized entity can create the digital fund tokens on behalf of the owner of the non-digital securities and associate the digital fund tokens with a fund manager's digital account (for example "manager wallet"). In exemplary embodiments, the fund manager is managing at least one fund including a plurality of securities and/or other assets. In exemplary embodiments, the underlying securities and/or other assets that comprise the fund are first acquired and segregated into an escrow-type account in a manner such that they cannot be used for any purpose other than as collateral guaranteeing that the digital fund tokens created are supported by the actual underlying securities and/or assets. Once the securities and/or other assets that comprise the fund are segregated into the escrow-type account, the fund manager can then invoke the creation of one or more digital fund tokens for the particular fund. In exemplary embodiments, a single digital fund token represents a plurality of underlying securities and/or other assets that represent and/or are collateral for the digital fund token in the escrow-type account. In exemplary embodiments, the one or more digital fund tokens are then created and their creation is recorded on a distributed ledger.

In these embodiment where digital fund tokens are created and redeemed directly (without using intermediary digital tokens for individual securities and/or other assets), to redeem Crypto Fund shares, the clearing bank, fund manager, or other authorized entity can redeem the at least one digital fund token on behalf of the owner of the non-digital securities and destroy the digital fund tokens. In exemplary embodiments, the clearing bank, fund manager, or other authorized entity receives a request from an investor to redeem at least one digital fund token and responds by transferring some of the actual securities and/or other assets that correspond to the at least one digital fund token out of the escrow-type account to an account of the owner and destroys the at least one digital fund token which has been redeemed. In exemplary embodiments, the redemption and/or destruction of the one or more digital fund tokens is recorded on a distributed ledger.

As noted above, in exemplary embodiments digital fund tokens are created and redeemed indirectly (using intermediary digital tokens for individual securities and/or other assets). In these embodiments, to create Crypto Fund shares, a clearing bank, fund manager, or other authorized entity can generate digital fund tokens on behalf of the owner of the non-digital securities and associate the digital fund tokens with a fund manager's digital account (for example "manager wallet") by first creating digital tokens for a plurality of individual securities and/or other assets and then creating digital fund tokens from the digital tokens for the plurality of individual securities and/or other assets. In exemplary embodiments, the fund manager is managing at least one fund including a plurality of securities and/or other assets. In exemplary embodiments, the underlying securities and/or other assets that comprise the fund are first acquired and segregated into escrow-type accounts on a security/other asset basis in a manner such that they cannot be used for any purpose other than as collateral guaranteeing that the digital tokens and digital fund tokens created are supported by the actual underlying securities and/or assets. Once the securities and/or other assets that comprise the fund are segregated into the escrow-type accounts, the fund manager can then invoke the creation of one or more digital fund tokens for the particular fund. In exemplary embodiments, a plurality of digital tokens representing a plurality of different securities and/or other assets is created and their creation is recorded on a distributed ledger. In exemplary embodiments, at least one digital fund token is generated based on the plurality of digital tokens and the digital tokens are placed in an escrow-type account. In other embodiments, when the at least one digital fund token is generated based on the plurality of digital tokens, the digital tokens are destroyed. In exemplary embodiments, the digital fund token represents a plurality of digital tokens, where an underlying security or other asset represents and/or is collateral for each of the plurality of digital tokens in the escrow-type account. In exemplary embodiments, creation of the one or more digital fund tokens is recorded on a distributed ledger.

In these embodiment where digital fund tokens are created and redeemed indirectly (using intermediary digital tokens for individual securities and/or other assets), to redeem Crypto Fund shares, the clearing bank, fund manager, or other authorized entity can redeem the at least one digital fund token on behalf of the owner of the non-digital securities and destroy the digital fund tokens. In exemplary embodiments, the clearing bank, fund manager, or other authorized entity receives a request from an investor to redeem at least one digital fund token and responds by moving the digital tokens represented by the at least one digital fund token from the escrow-type account and destroying the at least one digital fund token. In other embodiments where the digital tokens represented by the at least one digital fund token were previously destroyed, new digital tokens represented by the at least one digital fund token are created and the at least one digital fund token is destroyed. The actual securities and/or other assets that correspond to the digital tokens that represented the redeemed digital fund token are then transferred from the escrow-type account to an account of the owner and the at least one digital fund token that is redeemed and the digital tokens that represented the at least one digital fund token that is redeemed are destroyed if they were not previously. In exemplary embodiments, the redemption and/or destruction of the one or more digital fund tokens and/or digital tokens represented by the digital fund tokens is recorded on a distributed ledger.

The fund manager can create a transaction to transfer the digital tokens to a creation wallet where the new fund shares will be created from the digital tokens. The transaction can specify the quantity and type of each security used to create the fund shares (such as 50 shares of security A, 100 shares of security B, 40 shares of security C). Once the digital tokens are associated with the creation wallet, the Crypto Fund Creation and Redemption Platform can generate one or more new digital fund tokens.

Each digital fund token is comprised of the specified type and quantity of securities for the fund (such as an ETF, mutual fund, index fund, etc.). The creation of the digital fund token is recorded to the distributed ledger. The Crypto Fund Creation and Redemption Platform can create a transaction to transfer the newly created digital fund tokens back to the manager wallet. Once the digital fund tokens are associated with the manager wallet, the manager can then place a sell order to trade the digital fund tokens in a secondary market (for example on a crypto exchange) on behalf of the owner.

Embodiments of the present disclosure also provide methods and systems for fund redemption (such as, a redemption of the underlying securities of an ETF, mutual fund, index fund, etc.). In some embodiments, an owner of the digital fund token may place a request for the redemption of the digital tokens and/or the underlying non-digital securities to the manager controlling the manager wallet associated with the digital fund tokens.

The manager can request that the digital fund token be exchanged for its underlying securities by creating a transaction to transfer the digital fund token from the manager wallet to a redemption wallet, along with a redemption transaction request. Once associated with the redemption wallet, the digital fund token can be redeemed for its underlying securities in the form of digital tokens. After the components are exchanged for the digital fund token, the digital fund token is destroyed so that it no longer exists. The conversion of the digital fund token into its components can be recorded to the distributed ledger. The Crypto Fund Creation and Redemption Platform can create a transaction to transfer the digital tokens from the redemption wallet to the manager wallet. When the digital tokens are associated with the manager wallet, the digital tokens can be redeemed for non-digital securities and provided to their owner.

As discussed above, the Crypto Fund Creation and Redemption Platform uses distributed ledgers/crypto ledgers (such as block chains) to document and verify ownership and availability of the digital fund tokens and the digital tokens used to create the digital fund tokens. Cryptographic techniques can be used to transfer the digital tokens and the digital fund tokens from one digital account to another digital account. For example, the digital fund tokens can be transferred to other owners using public-key cryptography and bidirectional encryption. Public-key cryptography requires a key pair, where the two keys are mathematically linked. One key is a public key that is freely shared among nodes in a peer-to-peer network. The other key is a private key that is not shared with the public. The public key is used to encrypt plaintext and to verify a digital signature. The private key is used to decrypt cipher text and to digitally sign transactions. Each digital account can have an associated key pair. Transaction messages may be digitally signed by the sender's private key to authenticate the sender's identity. Then, the sender's digitally-signed transaction message may be decrypted using the sender's public key to verify that the sender originated the transaction.

Ownership of the digital tokens and digital fund tokens may be based on ownership entries in distributed ledgers that are maintained by network nodes. The distributed ledgers (such as block chain for Bitcoin) record entries for each change in ownership of each digital token and digital fund token and may be mathematically linked to the key pairs. For example, to transfer a digital fund token from one owner to another (for example one addressed account to another addressed account), a transaction message (such as in packets or other data structures) may be broadcast to nodes on a peer-to-peer network. In an example, when the digital fund token is being transferred from the creation wallet to the manager wallet, the transaction message can be signed by the creation wallet's private key and may include information such as a history of the chain of title of the digital fund token and/or its components, the number of shares being transferred, and the manager wallet's public key-based address. When a majority of the nodes in the network agree that the sender has the proper chain of title, ownership is changed to the owner of the creation wallet and the ledger is updated to indicate the transaction.

In the following description, for the purposes of explanation, numerous specific details are set forth in order to provide a thorough understanding of embodiments of the present disclosure. However, upon reading the disclosure, it will be apparent to one skilled in the art that embodiments may be practiced without some of these specific details. Additionally, while ETFs, mutual funds, and/or index funds are used as examples, the methods and systems described herein can be used with other assets that include multiple securities or other assets.

Benefits of the Crypto Fund Creation and Redemption Platform include transparency of ownership, easy recognition of the composition of a multiple security asset (such as any type of fund, including but not limited to the funds described herein), and creation and redemption of Crypto Fund shares. Cryptographically signing the transactions ensures authentication, authorization, and provenance.

The techniques introduced here can be embodied as special-purpose hardware (such as circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates an example of a network-based operating environment 100 in which some embodiments of the present disclosure may be used. As illustrated in FIG. 1, operating environment 100 includes applications 105A-105N running on one or more computing devices 110A-110M (such as a mobile device, a mobile phone, a tablet computer, a mobile media device, a mobile gaming device, a vehicle-based computer, a dedicated terminal, a public terminal, a kiosk, or a desktop or laptop computer). In some embodiments, applications 105A-105N for carrying out operations such as generating orders (such as orders to purchase digital fund shares) and checking account balances may be stored on the computing devices or may be stored remotely.

Computing devices 110A-110M can include mechanisms for receiving and sending traffic by connecting through network 120 to Crypto Fund Creation and Redemption Platform 125, broker-dealer(s) 115, fund manager 130, and clearing bank 135. In some embodiments, computing devices 110A-110M can retrieve or submit information to Crypto Fund Creation and Redemption Platform 125 and run one or more applications with customized content retrieved by Crypto Fund Creation and Redemption Platform 125, broker-dealer(s) 115, fund manager 130, and clearing bank 135. For example, computing devices 110A-110M each can execute a browser application or a customized client to enable interaction between the computing devices 110A-

110M and Crypto Fund Creation and Redemption Platform 125, fund manager 130, clearing bank 135, and broker-dealer(s) 115.

Broker-dealer(s) 115 are entities (for example natural persons, companies, or other organizations) that engage in the business of trading transactional items (such as ETFs, mutual fund shares, index fund shares, currencies, other types of securities) for their own account or on behalf of their customers. When executing trade orders on behalf of a customer, the entity acts as a broker. When executing trades for its own account, the entity acts as a dealer. Broker-dealer(s) 115 may receive orders from computing devices 110A-M, fund manager 130, or they may create their own orders. Broker-dealer(s) 115 may communicate orders to fund manager 130 and Crypto Fund Creation and Redemption Platform 125 via network 120.

Crypto Fund Creation and Redemption Platform 125 can run on one or more servers and can be used to create, redeem, and trade digital fund tokens. In some embodiments, as illustrated, Crypto Fund Creation and Redemption Platform 125 includes a fund creation module 215 and a fund redemption module 220 (both described in more detail with reference to FIG. 1 below).

In exemplary embodiments implementing direct creation of digital fund tokens, the fund creation module 215 can generate digital fund tokens directly once the underlying assets are segregated into the escrow-type account. In exemplary embodiments implementing indirect creation of digital fund tokens, the fund creation module 215 can receive digital tokens, which are digital representations of securities (such as bonds, stocks, assets, liabilities, currencies, commodities) into an associated creation wallet and create digital fund tokens from an assigned mixture of the digital tokens. The digital fund tokens represent shares of a fund (such as an ETF, mutual fund, and/or index fund) and thus are comprised of the digital tokens of more than one security, but are also a new security. The digital fund tokens can then be traded via a crypto exchange or ATS. Each transaction can be recorded to a distributed ledger such as Crypto Ledger(s) 155.

In exemplary embodiments implementing direct redemption of digital fund tokens, the fund redemption module 220 redeems digital fund tokens directly by releasing the underlying assets from the segregated escrow-type account and destroying the digital fund token. In exemplary embodiments implementing indirection creation of digital fund tokens, the fund redemption module 220 redeems digital fund tokens and separates the digital fund tokens into the digital fund token's underlying securities digital tokens (for example digital representations of securities). Owners of the fund shares can request such a transaction. The transaction, however, may be initiated by the manager of a fund.

Fund manager 130 can be the manager of an ETF, mutual fund, index fund, etc. Fund manager 130 can receive securities from the owner of such securities and agree to initiate a process to create one or more fund shares. In embodiments implementing indirect creation of digital fund tokens, once clearing bank 135 (or other entity) digitizes the securities, the digital tokens may be associated with a wallet of the fund manager 130. Fund manager 130 can transfer the digital tokens to the Crypto Fund Creation and Redemption Platform 125 for creation of digital fund tokens. Once the digital fund tokens are created and transferred back to the fund manager 130's wallet, the digital fund tokens can be traded on one or more Crypto Exchange(s) 150 or Crypto Ledger(s) 155.

Clearing bank 135 can hold non-digital securities in a fund manager 130's account and create the digital tokens (digital representation of the non-digital security). The digital token may be a one-for-one relationship with the security (such as each digital token represents one share of a security) or the digital token may represent different quantities of the security (such as each digital token represents 100 shares of a security).

Crypto Fund Creation and Redemption Platform 125 is communicably coupled with one or more Alternative Trading System(s) ("ATS(s)") 145, Crypto Exchange(s) 150, and Crypto Ledger(s) 155 through network 140.

Network 120 and network 140 can be the same network or can be separate networks and can be any combination of local area and/or wide area networks, using wired and/or wireless communication systems. Either network 120 or network 140 could be or could use any one or more of the following protocols/technologies: Ethernet, IEEE 802.11 or Wi-Fi, worldwide interoperability for microwave access (WiMAX), cellular telecommunication (such as 3G, 4G, 5G), CDMA, cable, digital subscriber line (DSL), etc. Similarly, the networking protocols used on network 120 and network 140 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 120 and network 140 may be represented using technologies, languages and/or formats including hypertext markup language (HTML) or extensible markup language (XML). In addition, all or some links can be encrypted using conventional encryption technologies such as secure sockets layer (SSL), transport layer security (TLS), and Internet Protocol security (IPSec).

ATS(s) 145 are non-exchange trading systems that find counterparties for transactions by matching buyers and sellers. ATS(s) 145 are an alternative to traditional stock exchanges. Examples of ATS(s) 145 include electronic communication networks (ECNs), crossing networks, dark pools, and call markets. ATS(s) 145 receive digitally signed orders such as FIX orders, find potential buy/sell order matches to trade digital assets, and contain a state of the order book which records the state of the orders.

Crypto Exchanges(s) 150 are exchanges that trade digital transactional items such as digital fund tokens, digital shares of stock, digital bonds, and crypto currencies. Digital shares of stock may be of the same class of stock as securities listed on traditional exchanges. Ownership of the digital transactional items in Crypto Exchange(s) 150 can be recorded on one or more distributed ledgers such as Crypto Ledger(s) 155. Crypto Exchange(s) 150 receive digitally signed crypto transactions (such as orders, cancellations, etc.) to effectuate trades.

Crypto Ledger(s) 155 are distributed ledgers that record economic transactions such as the creation of a digital fund token from two or more digital tokens or a sale of digital transactional items in exchange for funds. Crypto Ledger(s) 155 vary per unit. For example, Bitcoin uses a distributed public ledger called the block chain. When Crypto Ledger(s) 155 receive a transaction signed with the proper key from Crypto Fund Creation and Redemption Platform 125 and the transaction is verified by network nodes, the Crypto Ledger(s) 155 move the assets to the proper addressed account (such as manager wallet, creation wallet, redemption wallet, customer wallet, committed wallet) by recording the transaction (such as adding a block chain into the ledger).

Various data stores can be used to manage storage and access to digital tokens, digital fund tokens, user information, and other data. The data stores may be distributed data stores such as Crypto Ledger(s) 155. The data stores may be a data repository of a set of integrated objects that are modeled using classes defined in database schemas. Data stores may further include flat files that can store data. Crypto Fund Creation and Redemption Platform 125 and/or other servers may collect and/or access data from the data stores.

Figure 2:
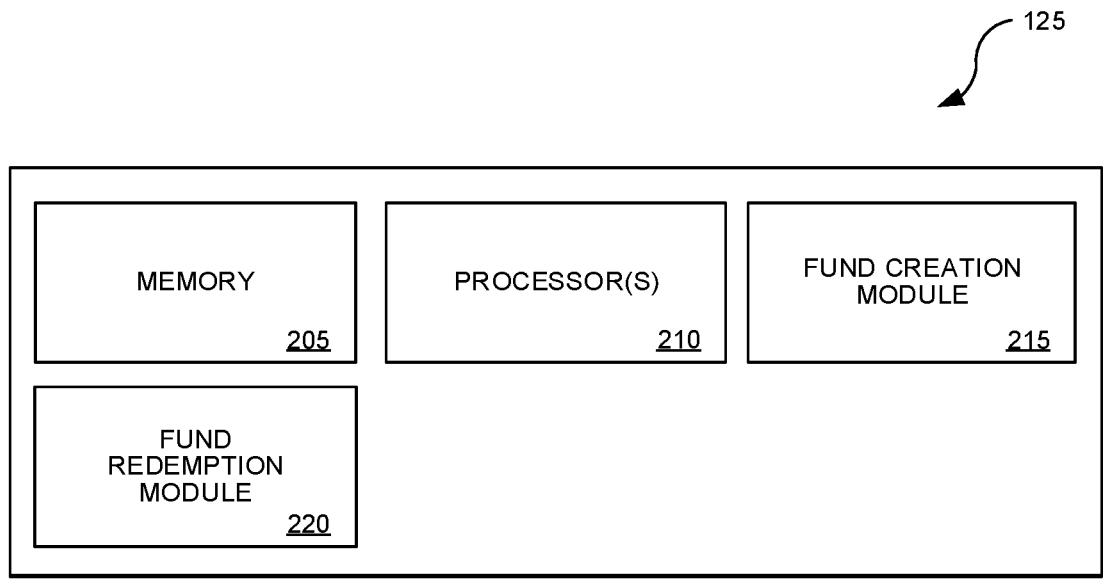
FIG. 2 illustrates a set of components in a Crypto Fund Creation and Redemption Platform in accordance with various embodiments of the disclosure.

FIG. 2 illustrates a set of components within Crypto Creation and Redemption Platform 125 according to one or more embodiments of the present disclosure. According to the embodiments shown in FIG. 2, Crypto Creation and Redemption Platform 125 can include memory 205, one or more processor(s) 210, fund creation module 215 and fund redemption module 220. Other embodiments may include some, all, or none of these modules and components along with other modules, applications, and/or components. Still yet, some embodiments may incorporate two or more of these modules and components into a single module and/or associate a portion of the functionality of one or more of these modules with a different module. For example, in one embodiment, fund creation module 215 and fund redemption module 220 can be combined into a single component.

Memory 205 can be any device, mechanism, or populated data structure used for storing information. In accordance with some embodiments of the present disclosure, memory 205 can be or include, for example, any type of volatile memory, nonvolatile memory, and/or dynamic memory. For example, memory 205 can be random access memory, memory storage devices, optical memory devices, magnetic media, floppy disks, magnetic tapes, hard drives, erasable programmable read-only memories (EPROMs), electrically erasable programmable read-only memories (EEPROMs), compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality of fund creation module 215 and fund redemption module 220.

In exemplary embodiments implementing indirect creation of digital fund tokens, fund creation module 215 can receive digital tokens into a creation wallet. The creation wallet may be controlled by Crypto Fund Creation and Redemption Platform 125. The digital tokens may have been created by a clearing bank 135 and placed into a manager wallet which is controlled by the fund manager 130. The manager wallet and the creation wallet may each have an associated key pair where each key pair includes one private key and one public key. The two parts of each key pair are mathematically linked.

In exemplary embodiments implementing indirect creation of digital fund tokens, the transaction transferring the digital tokens from the manager wallet to the creation wallet can include an indication of the composition of each fund share, the digital tokens, and a public key or address of the creation wallet. The transaction can be signed with the private key of the manager wallet to transfer the digital tokens into the creation wallet. Upon receipt of the digital tokens and the composition of the fund shares, fund creation module 215 creates digital fund tokens from the digital tokens by combining the appropriate quantities and types of digital tokens.

Once the digital fund tokens are created, fund creation module 215 transfers the digital fund tokens from the creation wallet to the manager wallet. The transaction may include a public key of the manager wallet and the digital fund tokens and can be signed with the private key of the creation wallet.

The transactions of transferring the digital tokens to the creation wallet, creating the digital fund tokens, and transferring the digital fund token to the manager wallet can be recorded to a distributed ledger, allowing for transparency in ownership and composition of the digital fund tokens.

Fund redemption module 220 can receive a redemption transaction request from a manager. The redemption transaction request may include digital fund tokens that are stored in the manager wallet and a public key (for example address) of a redemption wallet. In some embodiments, instructions on how to redeem digital securities from the digital fund token or information on the composition of the digital fund token are included in the redemption transaction request. The redemption transaction request may be signed by a private key of the manager wallet.

In exemplary embodiments implementing indirect redemption of digital fund tokens, fund redemption module 220 can create a transaction to transfer the digital tokens to the manager wallet. The transaction can include the digital tokens, a public key of the manager wallet, and an indication of the redemption transaction. The transaction can be signed with a private key of the redemption wallet. The transactions of transferring the digital fund tokens to the redemption wallet, redeeming the digital fund tokens for digital securities (for example recording that one less fund share exists and additional digital securities now exist), and transferring the digital tokens to the manager wallet can be recorded to a distributed ledger.

Figure 3:
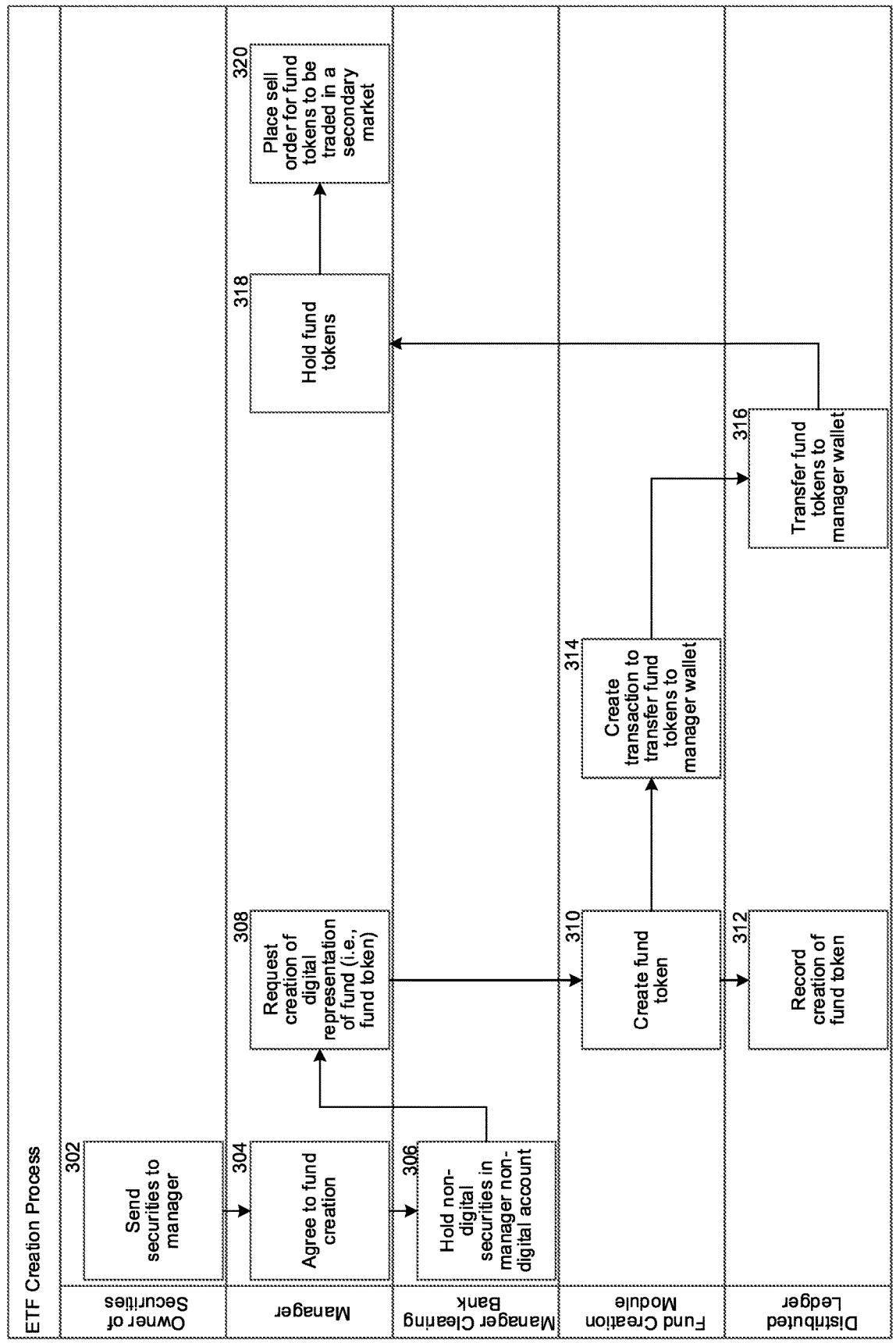
FIG. 3 illustrates a process of directly creating Crypto Fund shares in accordance with various embodiments of the disclosure.

FIG. 3 illustrates a process for directly creating Crypto Fund shares from the underlying assets. An owner of securities can, upon request, send the non-digital securities to a fund manager (302). The securities can include various types of stocks, commodities, bonds, or other transactional items in various quantities (such as 10,000 shares of security A, 500 shares of security B). The fund manager may agree to creation of fund shares and request the manager clearing bank to create digital representations of the securities (304). By such agreement and request, the manager clearing bank can hold the non-digital securities in an account owned by the manager (306). The manager can request creation of digital representations of at least one fund (for example digital fund tokens) (308). The fund creation module can create the at least one digital fund token (310) or another digital representation of the multiple security asset.

Upon creation, the at least one digital fund token, including ownership history, are recorded to a distributed ledger (312). After the at least one digital fund token is created, the Crypto Fund creation module creates a transaction to transfer the at least one digital fund token to the manager wallet (314). The transaction can include the digital fund tokens, a public address or key of the manager wallet, a description of the digital fund tokens, and/or transaction information. The transaction is signed with the private key of the creation wallet. The digital fund tokens are transferred after the network nodes of the distributed ledger verify ownership of the digital fund tokens and the signature of the creation wallet (316). The manager wallet can hold the digital fund tokens (318) or place a sell order to sell the digital fund tokens in a secondary market (such as cryptographic exchange or other ATS) (320), as desired by the owner. In some embodiments, the digital fund tokens may be shorted.

Figure 4:
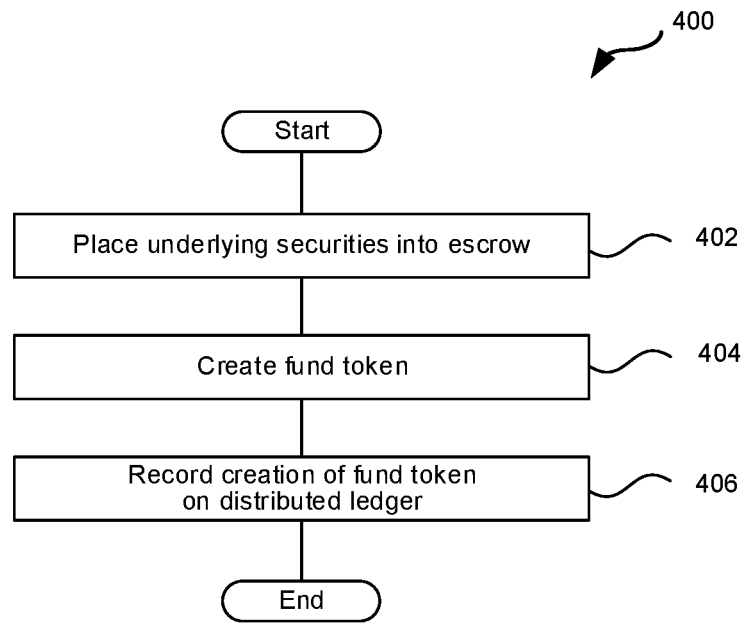
FIG. 4 is a flowchart illustrating a process of directly creating Crypto Fund shares according to one or more embodiments of the present disclosure.

FIG. 4 is a flowchart illustrating a process 400 of directly creating Crypto Fund shares. Receiving operation 402 places the underlying securities into escrow. Creating operation 404 creates digital fund tokens (for example Crypto Fund shares). The digital fund tokens can be traded via a crypto exchange or ATS. Recording operation 406 records the creation of the digital fund token on a distributed ledger. In exemplary embodiments, a further creating operation creates a transaction to transfer the digital fund tokens back to the manager's digital account. The transfer can be effectuated when the transaction to move the digital fund tokens is signed with a private key of the digital creation account and the network nodes of a distributed ledger agree with the ownership history.

Figure 5:
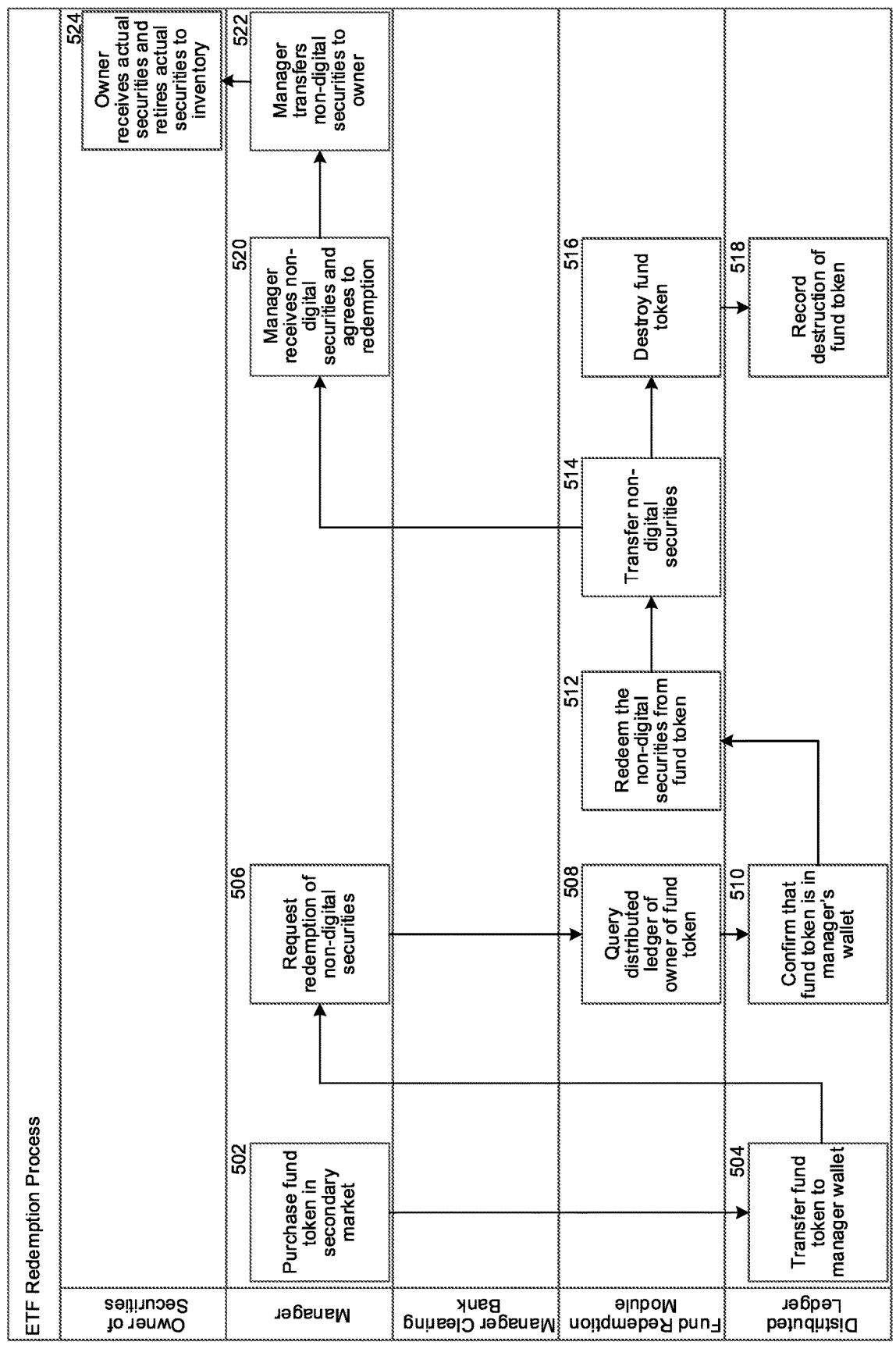
FIG. 5 illustrates a process of directly redeeming Crypto Fund shares in accordance with various embodiments of the disclosure.

FIG. 5 illustrates a process for directly redeeming Crypto Fund shares. The Crypto Fund shares (for example digital fund tokens) are traded in the secondary market. A manager can purchase digital fund tokens by placing a buy order for at least one digital fund token (such as on behalf of a customer or the fund itself) (502). Once the at least one digital fund token have been purchased by the manager or are otherwise held by the manager, the crypto exchange system transfers the at least one digital fund token to the manager's wallet (for example fourth addressed account) and such transfer is recorded on the distributed ledger (504). The manager may request redemption of the non-digital securities (506). The fund redemption module may query the distributed ledger to ensure that the manager is the recorded owner of the at least one digital fund token (508). After the distributed ledger confirms ownership of the digital tokens (510), the fund redemption module can redeem the non-digital securities (512) and transfer the non-digital securities to the manager (514). Once the non-digital securities are redeemed and transferred, the at least one digital fund token is destroyed (516) and its destruction is recorded on the distributed ledger (518). Once the manager receives the non-digital securities (520), the manager may then transfer the non-digital securities to the owner of the securities (522). The owner of the securities can retire the securities to his or her inventory (524).

Figure 6:
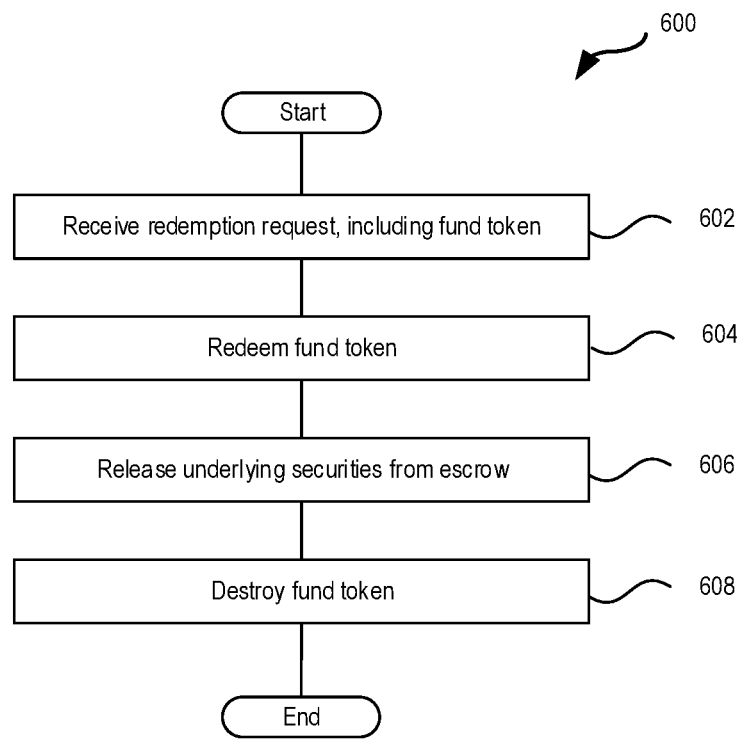
FIG. 6 is a flowchart illustrating a process of directly redeeming Crypto Fund shares according to one or more embodiments of the present disclosure.

FIG. 6 is a flowchart illustrating a process 600 of directly redeeming Crypto Fund shares. In receiving operation 602, a redemption request can be received at a redemption wallet. The redemption request may transfer digital fund tokens (for example Crypto Fund shares) to the redemption wallet and may further include instructions on how to redeem the underlying securities. Redeeming operation 604 may redeem the underlying securities composing the digital fund token in exchange for the digital fund token. Creating operation 606 can create a transaction to release the underlying securities from escrow. The transfer can be effectuated when the transaction to move the digital tokens is signed with a private key of the digital creation account and the network nodes of a distributed ledger agree with the ownership history. Destroying operation 608 can destroy the digital fund token once it has been redeemed.

Figure 7:
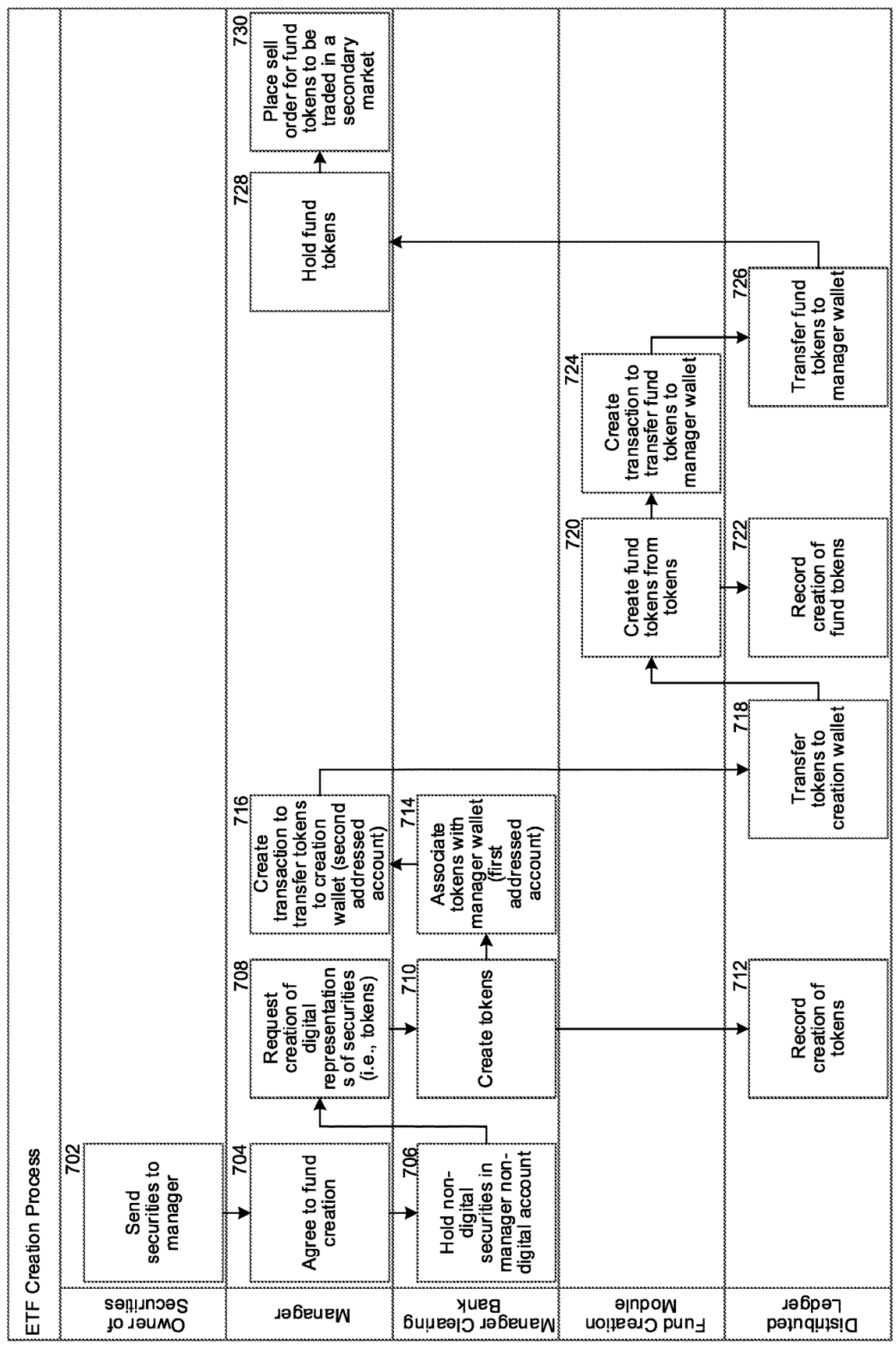
FIG. 7 illustrates a process of indirectly creating Crypto Fund shares in accordance with various embodiments of the disclosure.

FIG. 7 illustrates a process for indirectly creating Crypto Fund shares. An owner of securities can, upon request, send the non-digital securities to a fund manager (702). The securities can include various types of stocks, commodities, bonds, or other transactional items in various quantities (such as 10,000 shares of security A, 500 shares of security B). The fund manager may agree to creation of fund shares and request the manager clearing bank to create digital representations of the securities (704). By such agreement and request, the manager clearing bank can hold the non-digital securities in an account owned by the manager (706). The manager can request creation of digital representations of the securities (for example digital tokens) (708). The manager clearing bank can create the digital tokens (710). The digital representations of the securities can be digital tokens, where each of the digital tokens represents one or more shares of a particular security. Upon creation, the digital tokens, including ownership history, are recorded to a distributed ledger (712). The manager clearing bank can associate the digital tokens with the manager wallet, which may be referred to as a first addressed account (714).

The manager creates a transaction to transfer the digital tokens to a creation wallet (for example second addressed account) where the digital tokens will be committed to a fund (716). The transaction can include the digital tokens, a public key or address of the creation wallet, and an indication of the composition of a fund share, and the transaction can be signed by the private key of the manager wallet. After the network nodes of the distributed ledger verify the transaction by checking the ownership history and whether the transaction was signed by the private key of the manager wallet, the digital tokens are transferred to the creation wallet and the distributed ledger records the transfer (718). Prior to the commit transaction taking place, the Crypto Fund creation module can verify that the digital tokens are associated with the manager wallet by checking the ownership recorded on the distributed ledger using the public key of the manager wallet.

Next, the Crypto Fund creation module can create digital fund tokens comprised of specified types and quantities of the digital tokens (720). Thus, each digital fund token represents a share of the fund (such as an ETF, mutual fund, index fund, etc.). For example, a digital fund token may include 50 digital tokens representing 50 shares of security A and 100 digital tokens representing 200 shares of security B. Creation of the digital fund tokens from the digital tokens is recorded on the distributed ledger (722).

After the digital fund tokens are created, the Crypto Fund creation module creates a transaction to transfer the digital fund tokens from the creation wallet to the manager wallet (724). The transaction can include the digital fund tokens, a public address or key of the manager wallet, a description of the digital fund tokens, and/or transaction information. The transaction is signed with the private key of the creation wallet. The digital fund tokens are transferred after the network nodes of the distributed ledger verify ownership of the digital fund tokens and the signature of the creation wallet (726). In some embodiments, prior to the transaction, the manager can verify that the digital tokens are associated with the creation wallet by checking the ownership recorded on the distributed ledger using the public key of the creation wallet. The manager wallet can hold the digital fund tokens (728) or place a sell order to sell the digital fund tokens in a secondary market (such as cryptographic exchange or other ATS) (730), as desired by the owner. In some embodiments, the digital fund tokens may be shorted.

Figure 8:
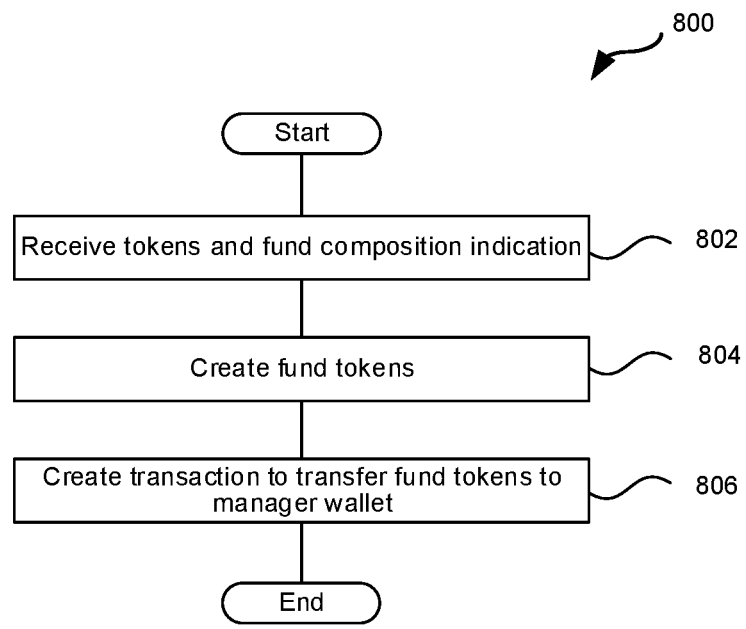
FIG. 8 is a flowchart illustrating a process of indirectly creating Crypto Fund shares according to one or more embodiments of the present disclosure.

FIG. 8 is a flowchart illustrating a process 800 of indirectly creating Crypto Fund shares. Receiving operation 802 receives digital tokens from a manager wallet into a creation wallet. The digital tokens can be digital representations of securities owned or controlled by the manager. When the digital tokens are received into the creation wallet, additional information regarding a fund share's composition also may be received, including quantities and types of securities that comprise each fund share. Creating operation 804 creates digital fund tokens (for example Crypto Fund shares) by combining the digital tokens in accordance with the assigned composition. The digital fund tokens can be traded via a crypto exchange or ATS. Creating operation 806 creates a transaction to transfer the digital fund tokens back to the manager's digital account. The transfer can be effectuated when the transaction to move the digital fund tokens is signed with a private key of the digital creation account and the network nodes of a distributed ledger agree with the ownership history.

Figure 9:
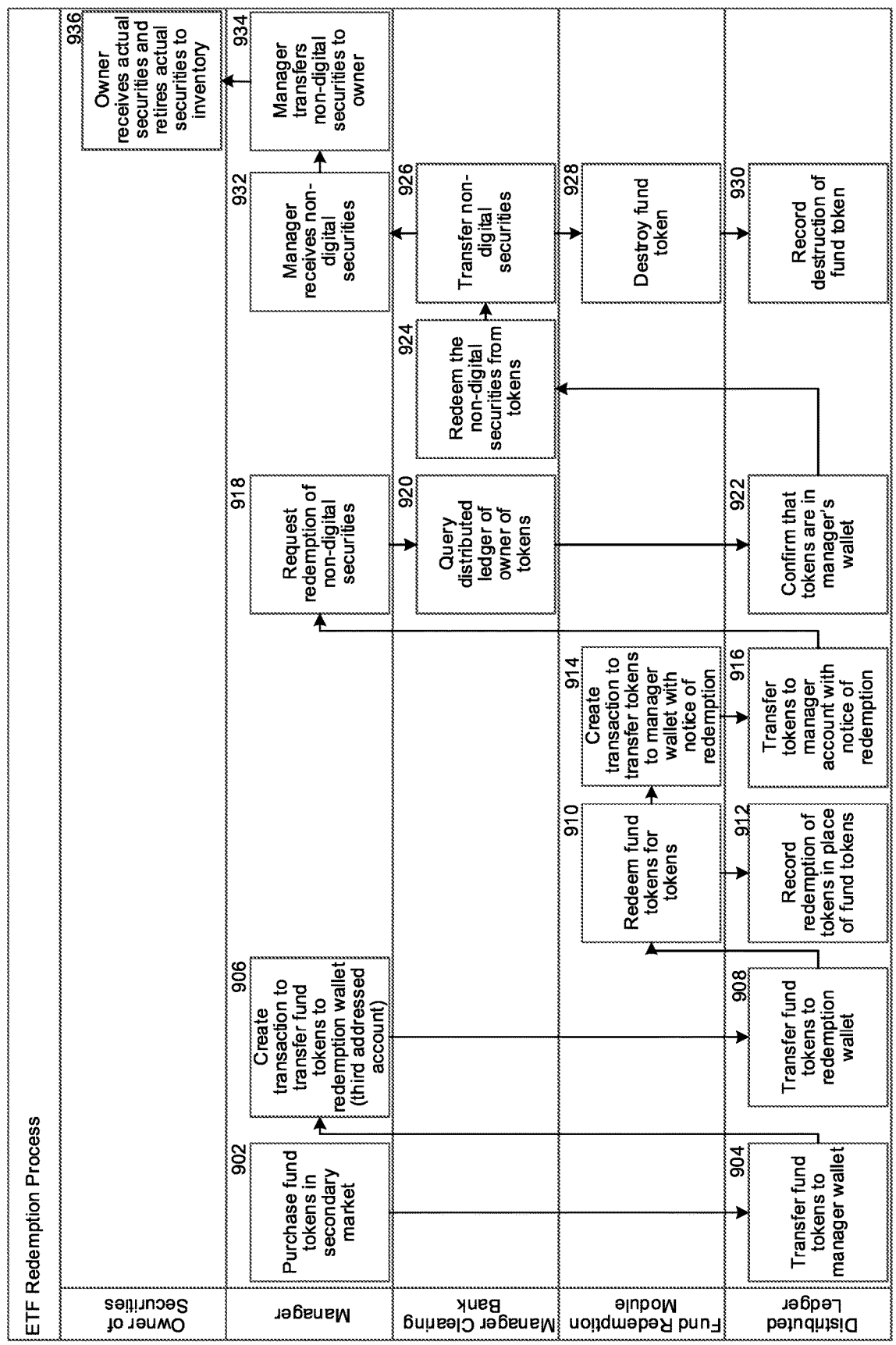
FIG. 9 illustrates a process of indirectly redeeming Crypto Fund shares in accordance with various embodiments of the disclosure.

FIG. 9 illustrates a process for indirectly redeeming Crypto Fund shares. The Crypto Fund shares (for example digital fund tokens) are traded in the secondary market. A manager can purchase digital fund tokens by placing a buy order for the digital fund tokens (such as on behalf of a customer or the fund itself) (902). Once the digital fund tokens have been purchased by the manager or are otherwise held by the manager, the crypto exchange system transfers the digital fund tokens to the manager's wallet (for example fourth addressed account) and such transfer is recorded on the distributed ledger (904). The manager may create a transaction to redeem the individual digital securities (for example digital tokens) from the digital fund tokens (906). The redemption transaction request may include the digital fund tokens, a public address of a redemption wallet (for example third addressed account), and instructions to complete the redemption transaction. The redemption transaction request can be signed with the private key of the manager's wallet, transferring the digital fund tokens to the redemption wallet. After the network nodes verify ownership and signatures, the digital fund tokens are transferred from the manager's wallet to the redemption wallet and the transfer is recorded on the distributed ledger (908). In some embodiments, the manager wallet in the FIG. 7 is the same as the manager wallet in FIG. 9. In some embodiments, the creation wallet and the redemption wallet are the same wallet.

Next, Crypto Fund redemption module redeems the digital tokens from the digital fund tokens, thereby removing the digital fund tokens from the fund and converting the digital fund tokens into the individual securities that composed the fund shares (910). The redemption transaction can be recorded to a distributed ledger so there is a history of when the digital tokens were redeemed from the digital fund token, including the ownership history (912). The Crypto Fund redemption module can create a transaction to transfer the digital tokens to the manager's wallet (914). Such transaction can include the digital tokens, a public key of the manager's wallet, and a notice that the digital token funds have been redeemed for the digital securities. The transaction may be signed by the private key of the redemption wallet. Once the network nodes have verified ownership history and the signature, the digital tokens can be transferred to the manager's wallet and recorded to the distributed ledger (916).

Once the digital securities are in the manager's wallet, or upon request from the manager, the manager may request redemption of the non-digital securities (918). The manager's clearing bank may query the distributed ledger to ensure that the manager is the recorded owner of the digital tokens (920). After the distributed ledger confirms ownership of the digital tokens (922), the manager's clearing bank can redeem the non-digital securities (924) and transfer the non-digital securities to the manager (926). Once the non-digital securities are redeemed and transferred, the at least one digital fund token is destroyed (928) and its destruction is recorded on the distributed ledger (930). Once the manager receives the non-digital securities (932), the manager may then then transfer the non-digital securities to the owner of the securities (934). The owner of the securities can retire the securities to his or her inventory (936).

Figure 10:
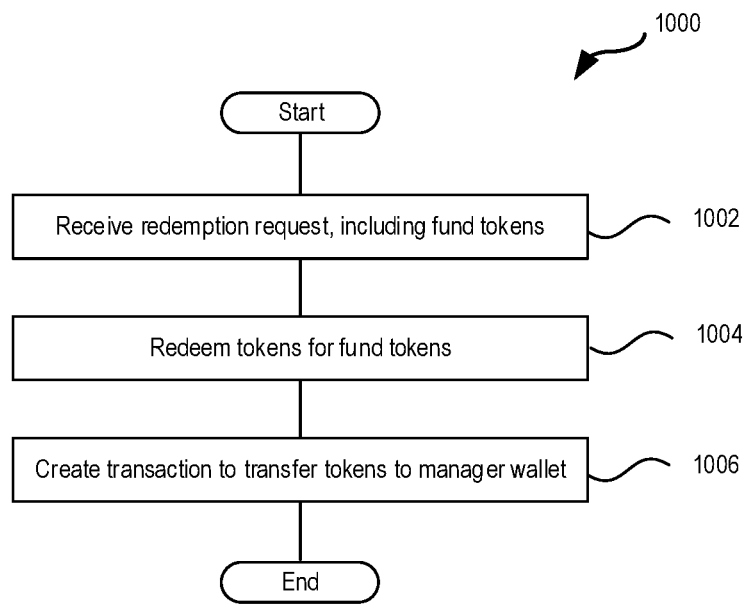
FIG. 10 is a flowchart illustrating a process of indirectly redeeming Crypto Fund shares according to one or more embodiments of the present disclosure.

FIG. 10 is a flowchart illustrating a process 1000 of redeeming Crypto Fund shares. In receiving operation 1002, a redemption request can be received at a redemption wallet. The redemption request may transfer digital fund tokens (for example Crypto Fund shares) to the redemption wallet and may further include instructions on how to redeem the digital tokens that compose the digital fund token. Redeeming operation 1004 may redeem the digital securities composing the digital fund token in exchange for the digital fund token. Creating operation 1006 can create a transaction to transfer the digital tokens to a manager wallet. The transfer can be effectuated when the transaction to move the digital tokens is signed with a private key of the digital creation account and the network nodes of a distributed ledger agree with the ownership history.

Figure 11:
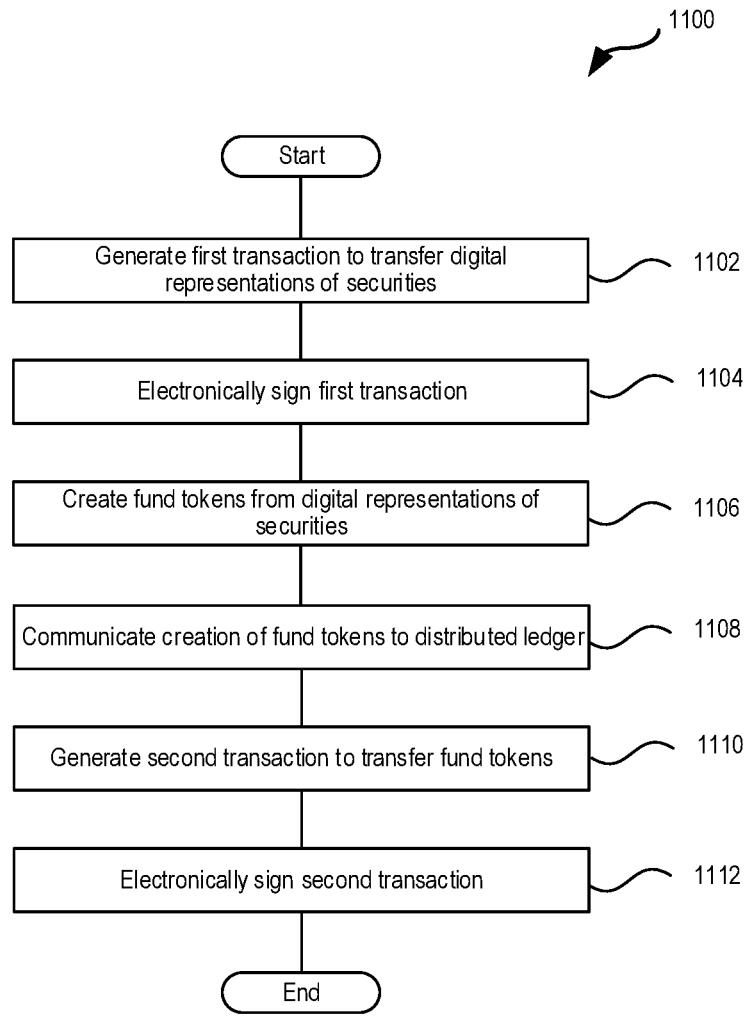
FIG. 11 is a flowchart illustrating a process of creating Crypto Fund shares according to one or more embodiments of the present disclosure.

FIG. 11 is a flowchart illustrating a process 1100 of creating multiple security asset shares. Generating operation 1102 generates a first transaction to transfer digital representations of securities from a first addressed account such as a manager wallet to a second addressed account such as a creation account. The first transaction can include an indication of a composition of an exchange traded fund share (or other multiple security asset). Signing operation 1104 electronically signs the first transaction. Creating operation 1106 creates digital fund tokens using the digital representations of securities such that each digital fund token is comprised of the composition of an exchange traded fund share (or other multiple security asset). Communicating operation 1108 communicates the creation of the digital fund tokens in place of the digital representations of the securities to a distributed ledger. Generating operation 1110 generates a second transaction to transfer the digital fund tokens from the second addressed account to the first addressed account. Signing operation 1112 electronically signs the second transaction with a private key of the second addressed account.

Figure 12:
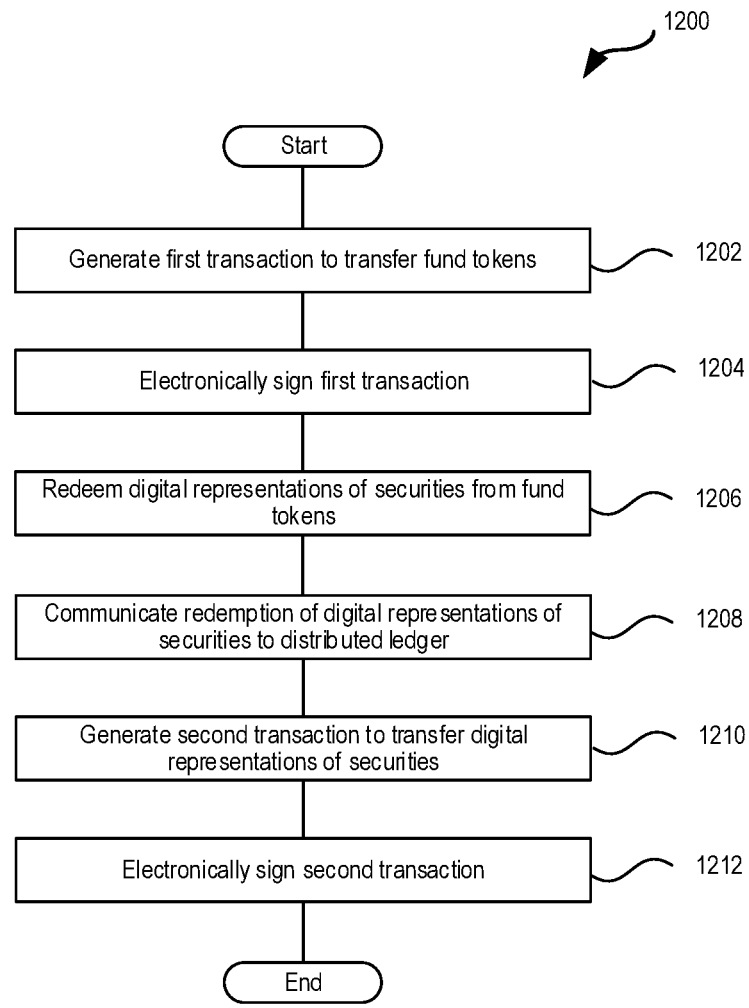
FIG. 12 is a flowchart illustrating a process of redeeming Crypto Fund shares according to one or more embodiments of the present disclosure.

FIG. 12 is a flowchart illustrating a process 1200 of redeeming multiple security asset shares. Generating operation 1202 generates a first transaction to transfer digital fund tokens from a first addressed account such as a manager wallet to a second addressed account such as a redemption wallet. The digital fund tokens are comprised of more than one digital representations of securities. Signing operation 1204 electronically signs the first transaction with a private key of the first addressed account. Redeeming operation 1206 redeems digital representations of securities from the digital fund tokens. Communicating operation 1208 communicates the redemption of the digital representations of securities in place of the digital fund tokens. Generation operation 1210 generates a second transaction to transfer the digital representations of securities from the second addressed account to the first addressed account. Signing operation 1212 electronically signs the second transaction.

Computer System Overview

Figure 13:
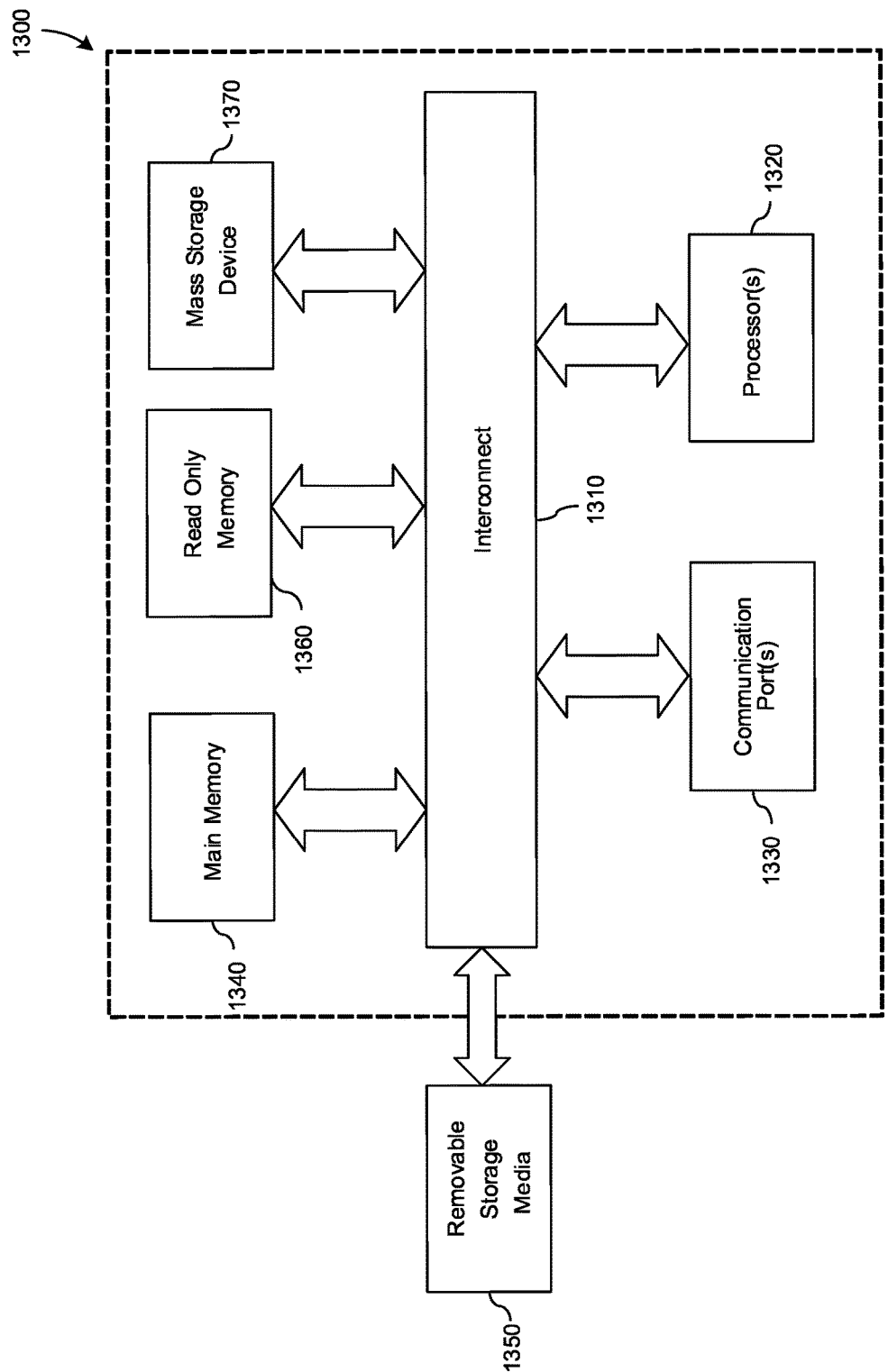
FIG. 13 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 13 is an example of a computer system 1300 with which embodiments of the present disclosure may be utilized. According to the present example, the computer system 1300 includes an interconnect 1310, at least one processor(s) 1320, at least one communication port(s) 1330, a main memory 1340, a removable storage media 1350, a read only memory 1360, and a mass storage device 1370.

Processor(s) 1320 can be any known processor. Communication port(s) 1330 can be or include, for example, any of an RS-232 port for use with a modem-based dialup connection, a 10/100 Ethernet port, or a Gigabit port using copper or fiber. The nature of communication port(s) 1330 may be chosen depending on a network such a Local Area Network (LAN), Wide Area Network (WAN), or any network to which the computer system 1700 connects.

Main memory 1340 can be Random Access Memory (RAM), or any other dynamic storage device(s) commonly known in the art. Read only memory 1360 can be any static storage device(s) such as Programmable Read Only Memory (PROM) chips for storing static information such as instructions for processor(s) 1320.

Mass storage device 1370 can be used to store information and instructions. For example, hard disks such as the Adaptec® family of SCSI drives, an optical disc, an array of disks such as RAID, such as the Adaptec family of RAID drives, or any other mass storage devices may be used.

Interconnect 1310 can be or include one or more buses, bridges, controllers, adapters, and/or point-to-point connections. Interconnect 1310 communicatively couples processor(s) 1320 with the other memory, storage, and communication blocks. Interconnect 1310 can be a PCI/PCI-X or SCSI based system bus depending on the storage devices used.

Removable storage media 1350 can be any kind of external hard-drives, floppy drives, Compact Disc-Read Only Memory (CD-ROM), Compact Disc-Re-Writable (CD-RW), Digital Video Disc-Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, for example, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for creating, redeeming, and trading multiple security assets. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes an asset trading system utilizing a distributed ledger, the asset trading system comprising: at least one processor; and at least one computer readable storage medium having instructions stored thereon, which when executed by the at least one processor causes the asset trading system to: when a creation request to create a digital fund token representing at least one share of a fund having a plurality of different assets (i) is received, (ii) is electronically signed with a private key associated with a first addressed account, and (iii) indicates a composition of the at least one share of the fund: place the plurality of different assets represented by the at least one share of the fund into an escrow account; create the digital fund token, wherein the digital fund token indicates the composition of the share of the fund; and record the creation of the digital fund token on a distributed ledger.

Example 2 includes the asset trading system of Example 1, wherein the instructions, when executed by the at least one processor further causes the asset trading system to: when the creation request to create the digital fund token representing the at least one share of the fund having the plurality of different assets (i) is received, (ii) is electronically signed with the private key associated with the first addressed account, and (iii) indicates the composition of the at least one share of the fund: prior to creating the digital fund token, receive confirmation from the distributed ledger that the plurality of different assets represented by the at least one share of the fund are associated with the first addressed account.

Example 3 includes the asset trading system of any of Examples 1-2, wherein the instructions, when executed by the at least one processor further causes the asset trading system to: when the creation request to create the digital fund token representing the at least one share of the fund having the plurality of different assets (i) is received, (ii) is electronically signed with the private key associated with the first addressed account, and (iii) indicates the composition of the at least one share of the fund: prior to creating the digital fund token, create a plurality of digital tokens representing the plurality of different assets; and record the creation of the plurality of digital tokens on the distributed ledger; as part of creating the digital fund token, place the plurality of digital tokens representing the plurality of different assets into an escrow state; and record the escrow state of the plurality of digital tokens representing the plurality of different assets on the distributed ledger.

Example 4 includes the asset trading system of any of Examples 1-3, wherein the instructions, when executed by the at least one processor further causes the asset trading system to: when a redemption request to redeem the digital fund token representing the at least one share of the fund having the plurality of different assets (i) is received and (ii) is electronically signed with the private key associated with the first addressed account: release the plurality of different assets represented by the at least one share of the fund from the escrow account; destroy the digital fund token; and record the destruction of the digital fund token on the distributed ledger.

Example 5 includes the asset trading system of Example 4, wherein the instructions, when executed by the at least one processor further causes the asset trading system to: when the redemption request to redeem the digital fund token representing the at least one share of the fund having the plurality of different assets (i) is received and (ii) is electronically signed with the private key associated with the first addressed account: prior to destroying the digital fund token, remove the plurality of digital tokens representing the plurality of different assets from the escrow state; and record the removal of the escrow state of the plurality of digital tokens representing the plurality of different assets on the distributed ledger.

Example 6 includes the asset trading system of any of Examples 1-5, wherein the instructions, when executed by the at least one processor further causes the asset trading system to: when a transfer request to transfer the digital fund token representing the at least one share of the fund having the plurality of different assets (i) is received and (ii) is electronically signed with a private key associated with the first addressed account: transfer the digital fund token from the first addressed account to a second addressed account; and record the transfer of the digital fund token on the distributed ledger.

Example 7 includes the asset trading system of any of Examples 1-6, wherein the fund is one of an exchange traded fund, a mutual fund, an index fund, a bond fund, a commodity fund, a currency fund, and a real estate fund.

Example 8 includes a method of creating and redeeming digital fund tokens using a distributed ledger, the method comprising: when a creation request to create a digital fund token representing at least one share of a fund having a plurality of different assets (i) is received, (ii) is electronically signed with a private key associated with a first addressed account, and (iii) indicates a composition of the at least one share of the fund: placing the plurality of different assets represented by the at least one share of the fund into an escrow account; creating the digital fund token, wherein the digital fund token indicates the composition of the share of the fund; and recording the creation of the digital fund token on a distributed ledger.

Example 9 includes the method of Example 8, further comprising: when the creation request to create the digital fund token representing the at least one share of the fund having the plurality of different assets (i) is received, (ii) is electronically signed with the private key associated with the first addressed account, and (iii) indicates the composition of the at least one share of the fund: prior to creating the digital fund token, receiving confirmation from the distributed ledger that the plurality of different assets represented by the at least one share of the fund are associated with the first addressed account.

Example 10 includes the method of Example 9, further comprising: when the creation request to create the digital fund token representing the at least one share of the fund having the plurality of different assets (i) is received, (ii) is electronically signed with the private key associated with the first addressed account, and (iii) indicates the composition of the at least one share of the fund: prior to creating the digital fund token, creating a plurality of digital tokens representing the plurality of different assets; and recording the creation of the plurality of digital tokens on the distributed ledger; as part of creating the digital fund token, placing the plurality of digital tokens representing the plurality of different assets into an escrow state; and recording the escrow state of the plurality of digital tokens representing the plurality of different assets on the distributed ledger;

Example 11 includes the method of any of Examples 8-10, further comprising: when a redemption request to redeem the digital fund token representing the at least one share of the fund having the plurality of different assets (i)

is received and (ii) is electronically signed with the private key associated with the first addressed account: releasing the plurality of different assets represented by the at least one share of the fund from the escrow account; destroying the digital fund token; and recording the destruction of the digital fund token on the distributed ledger.

Example 12 includes the method of Example 11, further comprising: when the redemption request to redeem the digital fund token representing the at least one share of the fund having the plurality of different assets (i) is received and (ii) is electronically signed with the private key associated with the first addressed account: prior to destroying the digital fund token, removing the plurality of digital tokens representing the plurality of different assets from the escrow state; and recording the removal of the escrow state of the plurality of digital tokens representing the plurality of different assets on the distributed ledger.

Example 13 includes the method of any of Examples 8-12, further comprising: when a transfer request to transfer the digital fund token representing the at least one share of the fund having the plurality of different assets (i) is received and (ii) is electronically signed with a private key associated with the first addressed account: transferring the digital fund token from the first addressed account to a second addressed account; and recording the transfer of the digital fund token on the distributed ledger.

Example 14 includes the method of any of Examples 8-13, wherein the fund is one of an exchange traded fund, a mutual fund, an index fund, a bond fund, a commodity fund, a currency fund, and a real estate fund.

Example 15 includes a non-transitory computer-readable storage medium including a set of instructions that, when executed by one or more processors, cause a machine to: when a creation request to create a digital fund token representing at least one share of a fund having a plurality of different assets (i) is received, (ii) is electronically signed with a private key associated with a first addressed account, and (iii) indicates a composition of the at least one share of the fund: place the plurality of different assets represented by the at least one share of the fund into an escrow account; create the digital fund token, wherein the digital fund token indicates the composition of the share of the fund; and record the creation of the digital fund token on a distributed ledger.

Example 16 includes the non-transitory computer-readable storage medium of Example 15, wherein the instructions, when executed by one or more processors, further cause the machine to: when the creation request to create the digital fund token representing the at least one share of the fund having the plurality of different assets (i) is received, (ii) is electronically signed with the private key associated with the first addressed account, and (iii) indicates the composition of the at least one share of the fund: prior to creating the digital fund token, receive confirmation from the distributed ledger that the plurality of different assets represented by the at least one share of the fund are associated with the first addressed account.

Example 17 includes the non-transitory computer-readable storage medium of Example 16, wherein the instructions, when executed by one or more processors, further cause the machine to: when the creation request to create the digital fund token representing the at least one share of the fund having the plurality of different assets (i) is received, (ii) is electronically signed with the private key associated with the first addressed account, and (iii) indicates the composition of the at least one share of the fund: prior to creating the digital fund token, create a plurality of digital tokens representing the plurality of different assets; and record the creation of the plurality of digital tokens on the distributed ledger; as part of creating the digital fund token, place the plurality of digital tokens representing the plurality of different assets into an escrow state; and record the escrow state of the plurality of digital tokens representing the plurality of different assets on the distributed ledger.

Example 18 includes the non-transitory computer-readable storage medium of any of Examples 15-17, wherein the instructions, when executed by one or more processors, further cause the machine to: when a redemption request to redeem the digital fund token representing the at least one share of the fund having the plurality of different assets (i) is received and (ii) is electronically signed with the private key associated with the first addressed account: release the plurality of different assets represented by the at least one share of the fund from the escrow account; destroy the digital fund token; and record the destruction of the digital fund token on the distributed ledger.

Example 19 includes the non-transitory computer-readable storage medium of Example 18, wherein the instructions, when executed by one or more processors, further cause the machine to: when the redemption request to redeem the digital fund token representing the at least one share of the fund having the plurality of different assets (i) is received and (ii) is electronically signed with the private key associated with the first addressed account: prior to destroying the digital fund token, remove the plurality of digital tokens representing the plurality of different assets from the escrow state; and record the removal of the escrow state of the plurality of digital tokens representing the plurality of different assets on the distributed ledger.

Example 20 includes the non-transitory computer-readable storage medium of any of Examples 15-19, wherein the fund is one of an exchange traded fund, a mutual fund, an index fund, a bond fund, a commodity fund, a currency fund, and a real estate fund.

What is claimed is:

1. A computer implemented cryptographic asset trading system comprising:
   circuitry configured to:
      receive a creation request (i) including a digital signature of a first cryptographic key associated with a first account and (ii) including a composition of at least one share of a fund, the composition of the at least one share of the fund including a respective quantity of each of a plurality of different assets in the at least one share of the fund; and
      in response to receiving the creation request:
         place the respective quantity of each of the plurality of different assets represented by the at least one share of the fund into an escrow account associated with the computer implemented cryptographic asset trading system as collateral for a digital fund token serving as a digital representation of the fund;
         create and transfer the digital fund token to the first account (i) by cryptographically signing with a second cryptographic key associated with the computer implemented cryptographic asset trading system and (ii) based on the respective quantity of each of the plurality of different assets, the digital fund token including the composition of the at least one share of the fund, the composition of the at least one share of the fund including the respective quantity of each of the plurality of different assets in the at least one share of the fund represented by the digital fund token; and record the creation and transfer of the digital fund token to the first account on a distributed ledger thereby requiring cryptographic signing with the first cryptographic key associated with the first account to: (i) redeem the digital fund token from the first account or (ii) transfer the digital fund token from the first account to a second account.

2. The computer implemented cryptographic asset trading system of claim 1, wherein the circuitry is further configured to:

in response to receiving the creation request and prior to creating the digital fund token:

receive confirmation from the distributed ledger that the plurality of different assets represented by the at least one share of the fund are associated with the first account.

3. The computer implemented cryptographic asset trading system of claim 1, wherein the circuitry is further configured to:

in response to receiving the creation request and prior to creating the digital fund token:

create a plurality of digital tokens representing the plurality of different assets; and record the creation of the plurality of digital tokens on the distributed ledger; and in response to receiving the creation request and as part of creating the digital fund token:

place the plurality of digital tokens representing the plurality of different assets into an escrow state; and record the escrow state of the plurality of digital tokens representing the plurality of different assets on the distributed ledger.

4. The computer implemented cryptographic asset trading system of claim 1, wherein the circuitry is further configured to:

receive a redemption request including the digital signature of the first cryptographic key associated with the first account; and in response to receiving the redemption request:

release the plurality of different assets represented by the at least one share of the fund from the escrow account;

destroy the digital fund token; and record the destruction of the digital fund token on the distributed ledger.

5. The computer implemented cryptographic asset trading system of claim 4, wherein the circuitry is further configured to:

in response to receiving the redemption request and prior to destroying the digital fund token:

remove a plurality of digital tokens representing the plurality of different assets from an escrow state; and record the removal of the plurality of digital tokens representing the plurality of different assets from the escrow state on the distributed ledger.

6. The computer implemented cryptographic asset trading system of claim 1, wherein the circuitry is further configured to:

receive a transfer request including the digital signature of the first cryptographic key associated with the first account; and in response to receiving the transfer request:

transfer the digital fund token from the first account to the second account; and record the transfer of the digital fund token from the first account to the second account on the distributed ledger.

7. The computer implemented cryptographic asset trading system of claim 1, wherein the circuitry is further configured to:

place the respective quantity of each of the plurality of different assets represented by the at least one share of the fund into the escrow account as collateral for the digital fund token includes placing a quantity of at least one of an exchange traded fund, a mutual fund, an index fund, a bond fund, a commodity fund, a currency fund, and a real estate fund into the escrow account as collateral for the digital fund token.

8. A method comprising:

receiving, using circuitry, a creation request (i) including a digital signature of a first cryptographic key associated with a first account and (ii) including a composition of at least one share of a fund, the composition of the at least one share of the fund including a respective quantity of each of a plurality of different assets in the at least one share of the fund; and in response to receiving the creation request:

placing, using the circuitry, the respective quantity of each of the plurality of different assets represented by the at least one share of the fund into an escrow account associated with a computer implemented cryptographic asset trading system as collateral for a digital fund token serving as a digital representation of the fund;

creating and transferring, using the circuitry, the digital fund token to the first account (i) by cryptographically signing with a second cryptographic key associated with the computer implemented cryptographic asset trading system and (ii) based on the respective quantity of each of the plurality of different assets, the digital fund token including the composition of the at least one share of the fund, the composition of the at least one share of the fund including the respective quantity of each of the plurality of different assets in the at least one share of the fund represented by the digital fund token; and recording, using the circuitry, the creation and transfer of the digital fund token to the first account on a distributed ledger thereby requiring cryptographic signing with the first cryptographic key associated with the first account to: (i) redeem the digital fund token from the first account or (ii) transfer the digital fund token from the first account to a second account.

9. The method of claim 8, further comprising:

in response to receiving the creation request and prior to creating the digital fund token:

receiving, using the circuitry, confirmation from the distributed ledger that the plurality of different assets represented by the at least one share of the fund are associated with the first account.

10. The method of claim 9, further comprising:

in response to receiving the creation request and prior to creating the digital fund token:

creating, using the circuitry, a plurality of digital tokens representing the plurality of different assets; and recording, using the circuitry, the creation of the plurality of digital tokens on the distributed ledger; and in response to receiving the creation request and as part of creating the digital fund token:

placing, using the circuitry, the plurality of digital tokens representing the plurality of different assets into an escrow state; and recording, using the circuitry, the escrow state of the plurality of digital tokens representing the plurality of different assets on the distributed ledger.

11. The method of claim 8, further comprising:

receiving, using the circuitry, a redemption request including the digital signature of the first cryptographic key associated with the first account; and in response to receiving the redemption request:

releasing, using the circuitry, the plurality of different assets represented by the at least one share of the fund from the escrow account;

destroying, using the circuitry, the digital fund token; and recording, using the circuitry, the destruction of the digital fund token on the distributed ledger.

12. The method of claim 11, further comprising:

in response to receiving the redemption request and prior to destroying the digital fund token:

removing, using the circuitry, a plurality of digital tokens representing the plurality of different assets from an escrow state; and recording, using the circuitry, the removal of the plurality of digital tokens representing the plurality of different assets from the escrow state on the distributed ledger.

13. The method of claim 8, further comprising:

receiving, using the circuitry, a transfer request including the digital signature of the first cryptographic key associated with the first account; and in response to receiving the transfer request:

transferring, using the circuitry, the digital fund token from the first account to the second account; and recording, using the circuitry, the transfer of the digital fund token on the distributed ledger.

14. The method of claim 8, wherein placing the respective quantity of each of the plurality of different assets represented by the at least one share of the fund into the escrow account as collateral for the digital fund token includes placing a quantity of at least one of an exchange traded fund, a mutual fund, an index fund, a bond fund, a commodity fund, a currency fund, and a real estate fund into the escrow account as collateral for the digital fund token.

15. A non-transitory computer-readable storage medium including a set of instructions that, when executed by programmable circuitry, cause the programmable circuitry to:

receive a creation request (i) including a digital signature of a first cryptographic key associated with a first account and (ii) including a composition of at least one share of a fund, the composition of the at least one share of the fund including a respective quantity of each of a plurality of different assets in the at least one share of the fund; and in response to receiving the creation request:

place the respective quantity of each of the plurality of different assets represented by the at least one share of the fund into an escrow account associated with a computer implemented cryptographic asset trading system as collateral for a digital fund token serving as a digital representation of the fund;

create and transfer the digital fund token to the first account (i) by cryptographically signing with a second cryptographic key associated with the computer implemented cryptographic asset trading system and (ii) based on the respective quantity of each of the plurality of different assets, the digital fund token including the composition of the at least one share of the fund, the composition of the at least one share of the fund including the respective quantity of each of the plurality of different assets in the at least one share of the fund represented by the digital fund token; and record the creation and transfer of the digital fund token to the first account on a distributed ledger thereby requiring cryptographic signing with the first cryptographic key associated with the first account to: (i) redeem the digital fund token from the first account or (ii) transfer the digital fund token from the first account to a second account.

16. The non-transitory computer-readable storage medium of claim 15, wherein the instructions, when executed by the programmable circuitry, further cause the programmable circuitry to:

in response to receiving the creation request and prior to creating the digital fund token:

receive confirmation from the distributed ledger that the plurality of different assets represented by the at least one share of the fund are associated with the first account.

17. The non-transitory computer-readable storage medium of claim 16, wherein the instructions, when executed by the programmable circuitry, further cause the programmable circuitry to:

in response to receiving the creation request and prior to creating the digital fund token:

create a plurality of digital tokens representing the plurality of different assets; and record the creation of the plurality of digital tokens on the distributed ledger; and in response to receiving the creation request and as part of creating the digital fund token:

place the plurality of digital tokens representing the plurality of different assets into an escrow state; and record the escrow state of the plurality of digital tokens representing the plurality of different assets on the distributed ledger.

18. The non-transitory computer-readable storage medium of claim 17, wherein the instructions, when executed by the programmable circuitry, further cause the programmable circuitry to:

receive a redemption request including the digital signature of the first cryptographic key associated with the first account; and in response to receiving the redemption request:

release the plurality of different assets represented by the at least one share of the fund from the escrow account;

destroy the digital fund token; and record the destruction of the digital fund token on the distributed ledger.

19. The non-transitory computer-readable storage medium of claim 18, wherein the instructions, when executed by the programmable circuitry, further cause the programmable circuitry to:

in response to receiving the redemption request and prior to destroying the digital fund token:

remove a plurality of digital tokens representing the plurality of different assets from an escrow state; and record the removal of the plurality of digital tokens representing the plurality of different assets from the escrow state on the distributed ledger.

20. The non-transitory computer-readable storage medium of claim 15, wherein the instructions, when executed by the programmable circuitry, cause the programable circuitry to:
   place the respective quantity of each of the plurality of different assets represented by the at least one share of the fund into the escrow account as collateral for the digital fund token by placing a quantity of at least one of an exchange traded fund, a mutual fund, an index fund, a bond fund, a commodity fund, a currency fund, and a real estate fund into the escrow account as collateral for the digital fund token.

\* \* \* \* \*